US012561770B2

(12) United States Patent
Kawano

(10) Patent No.: US 12,561,770 B2
(45) Date of Patent: Feb. 24, 2026

(54) IMAGE PROCESSING APPARATUS, IMAGE PROCESSING METHOD, AND NON-TRANSITORY COMPUTER-READABLE STORAGE MEDIUM THAT GENERATE A CORRECTED IMAGE TO CORRECT DISTORTION IN A CAPTURED IMAGE

(71) Applicant: CANON KABUSHIKI KAISHA, Tokyo (JP)

(72) Inventor: Kyosuke Kawano, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 307 days.

(21) Appl. No.: 18/309,883

(22) Filed: May 1, 2023

(65) Prior Publication Data

US 2023/0377102 A1 Nov. 23, 2023

(30) Foreign Application Priority Data

May 17, 2022 (JP) ................................. 2022-081071

(51) Int. Cl.
*G06T 5/80* (2024.01)
*G06T 3/60* (2006.01)
(Continued)

(52) U.S. Cl.
CPC .................. *G06T 5/80* (2024.01); *G06T 3/60* (2013.01); *G06T 7/13* (2017.01); *G06T 7/30* (2017.01); *H04N 17/002* (2013.01)

(58) Field of Classification Search
CPC .... G06T 5/80; G06T 3/60; G06T 7/13; G06T 7/30; G06T 7/80; H04N 17/002
See application file for complete search history.

(56) References Cited

U.S. PATENT DOCUMENTS

| | | | | |
|---|---|---|---|---|
| 12,307,810 B2 * | 5/2025 | Suzuki | ..................... | G06T 7/60 |
| 2005/0078879 A1 * | 4/2005 | Sakurai | ..................... | G06T 3/02 |
| | | | | 348/747 |

(Continued)

FOREIGN PATENT DOCUMENTS

| | | | |
|---|---|---|---|
| JP | 4363152 B2 * | 11/2009 | |
| JP | 4561302 B2 * | 10/2010 | |
| JP | 2017-211200 A | 11/2017 | |

*Primary Examiner* — Henok Shiferaw
*Assistant Examiner* — Woo C Rhim
(74) *Attorney, Agent, or Firm* — Venable LLP

(57) ABSTRACT

An image processing apparatus generates a corrected image to correct distortion in a captured image shot by an image capturing apparatus and obtains an internal parameter of the capturing apparatus based on a straight line edge in the corrected image. For parameter candidates serving as correct candidates for the internal parameter, a corrected image is generated by performing a perspective projection conversion on the captured image using the parameter candidate. One of the plurality of parameter candidates is obtained as the internal parameter of the capturing apparatus based on a straight line edge in each corrected image. For each of a plurality of rotated images obtained by rotating the corrected image by different rotation angles, obtained are a length of a vertical straight line edge in the rotated image, an evaluation value becoming higher as a total of the lengths obtained increases, and a parameter candidate providing a highest evaluation.

14 Claims, 10 Drawing Sheets

(51) Int. Cl.
　　 *G06T 7/13*　　　　(2017.01)
　　 *G06T 7/30*　　　　(2017.01)
　　 *H04N 17/00*　　　(2006.01)

(56) References Cited

U.S. PATENT DOCUMENTS

| | | | | |
|---|---|---|---|---|
| 2005/0190986 A1* | 9/2005 | Sakurai | H04N 1/00283 | 382/275 |
| 2008/0239107 A1* | 10/2008 | Cho | H04N 23/611 | 348/241 |
| 2012/0154643 A1* | 6/2012 | Okuyama | H04N 23/698 | 348/241 |
| 2014/0307128 A1* | 10/2014 | Lai | G06T 5/80 | 348/240.99 |
| 2014/0362248 A1* | 12/2014 | Ishida | G06T 7/13 | 348/222.1 |
| 2015/0062292 A1* | 3/2015 | Kweon | H04N 23/81 | 348/37 |
| 2015/0062363 A1* | 3/2015 | Takenaka | H04N 23/698 | 348/218.1 |
| 2017/0330337 A1* | 11/2017 | Mizutani | G06T 5/50 | |
| 2019/0012766 A1* | 1/2019 | Yoshimi | G02B 27/64 | |
| 2019/0102910 A1* | 4/2019 | Kaneko | G06T 7/13 | |
| 2019/0325552 A1* | 10/2019 | Umesawa | G06T 3/4038 | |
| 2020/0242391 A1* | 7/2020 | Takahashi | G06V 10/44 | |
| 2020/0273205 A1* | 8/2020 | Yamashita | H04N 17/002 | |
| 2022/0230275 A1* | 7/2022 | Hohjoh | H04N 23/698 | |

* cited by examiner

F I G. 2

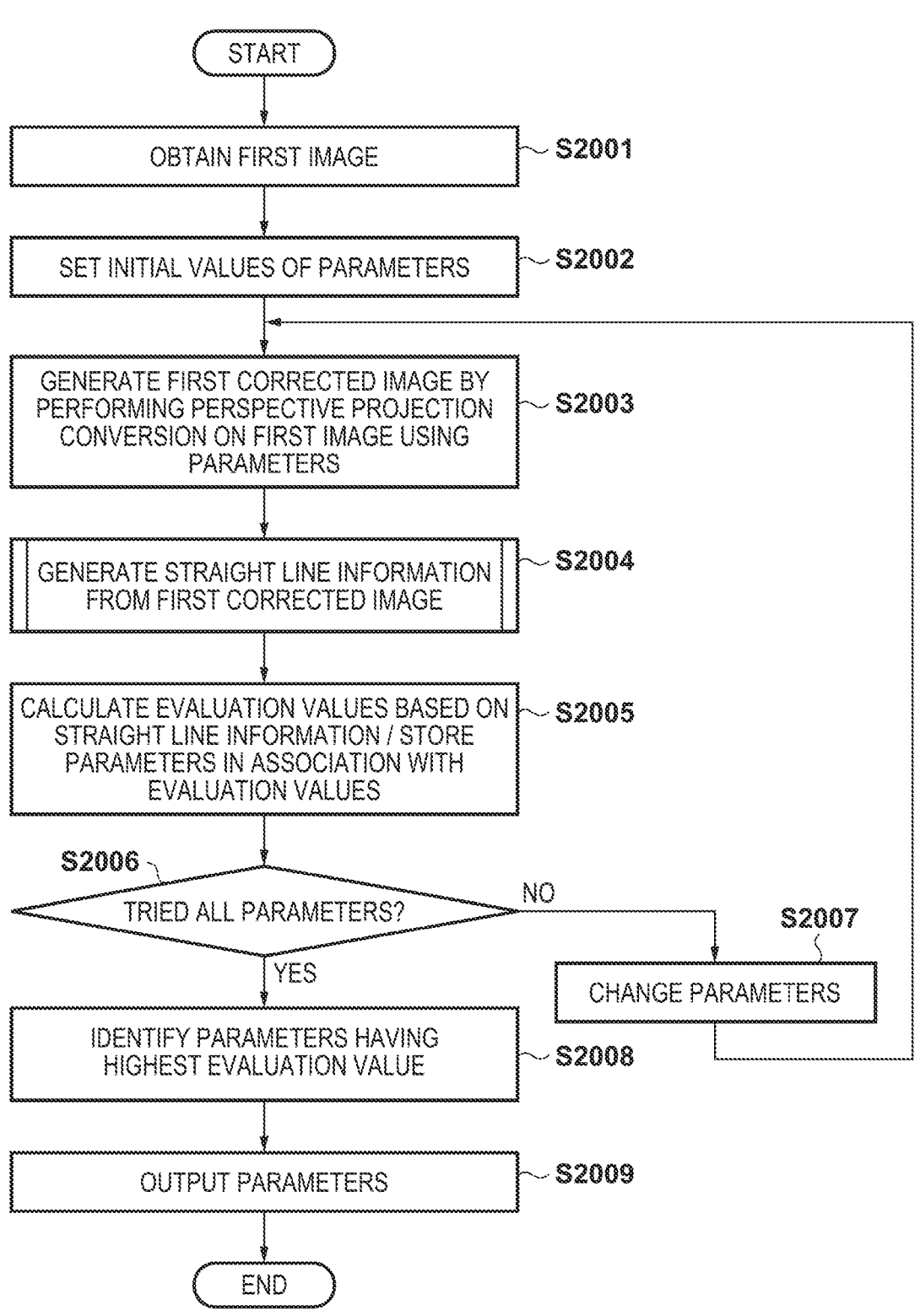

START

OBTAIN FIRST IMAGE — S2001

SET INITIAL VALUES OF PARAMETERS — S2002

GENERATE FIRST CORRECTED IMAGE BY PERFORMING PERSPECTIVE PROJECTION CONVERSION ON FIRST IMAGE USING PARAMETERS — S2003

GENERATE STRAIGHT LINE INFORMATION FROM FIRST CORRECTED IMAGE — S2004

CALCULATE EVALUATION VALUES BASED ON STRAIGHT LINE INFORMATION / STORE PARAMETERS IN ASSOCIATION WITH EVALUATION VALUES — S2005

S2006 — TRIED ALL PARAMETERS?

NO

S2007

CHANGE PARAMETERS

YES

IDENTIFY PARAMETERS HAVING HIGHEST EVALUATION VALUE — S2008

OUTPUT PARAMETERS — S2009

END

FIG. 5A
FIG. 5B
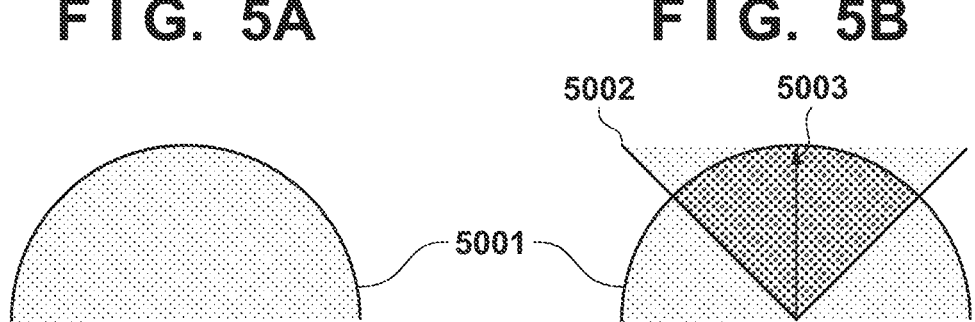
5001
5002 5003
FIG. 5C
FIG. 5D
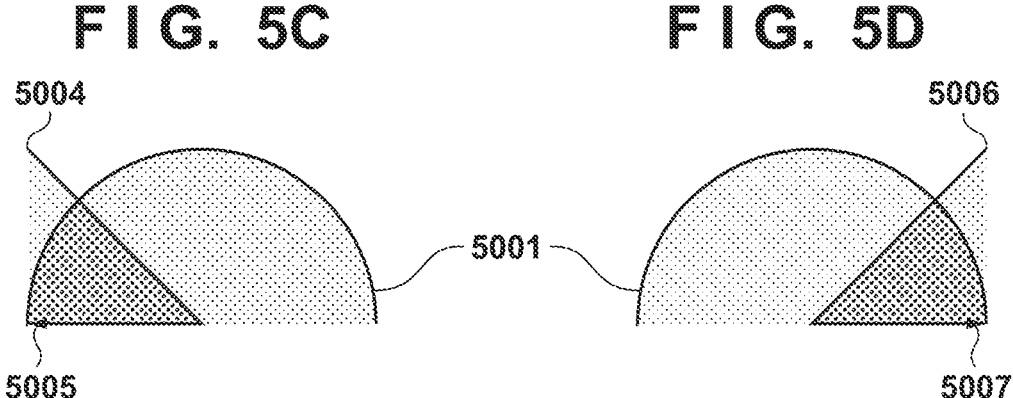
5001
5004
5005
5006
5007

FIG. 6A
FIG. 6B
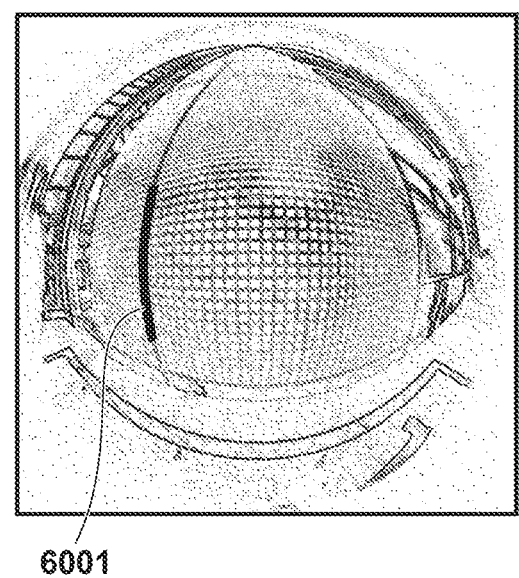
6001
FIG. 6C
6002
FIG. 6D
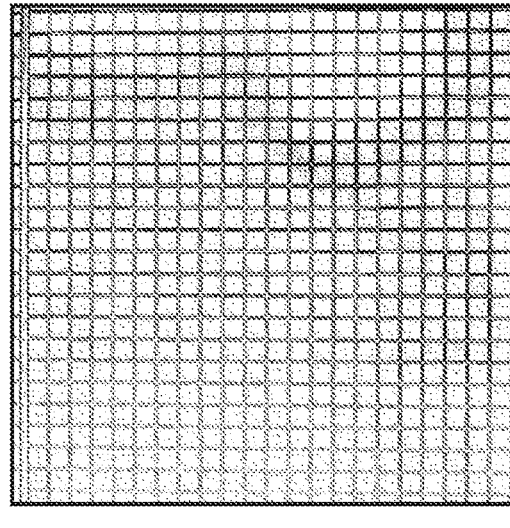
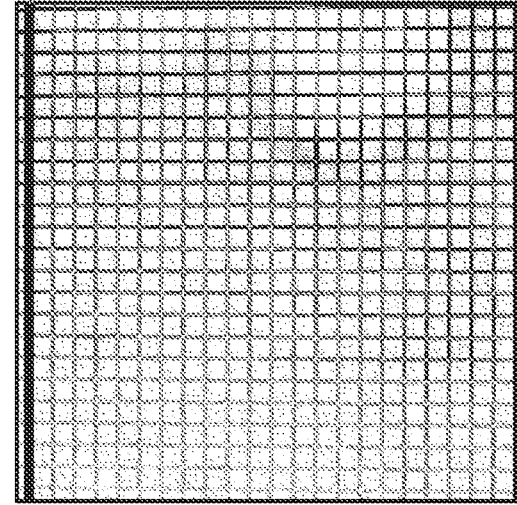

FIG. 7A
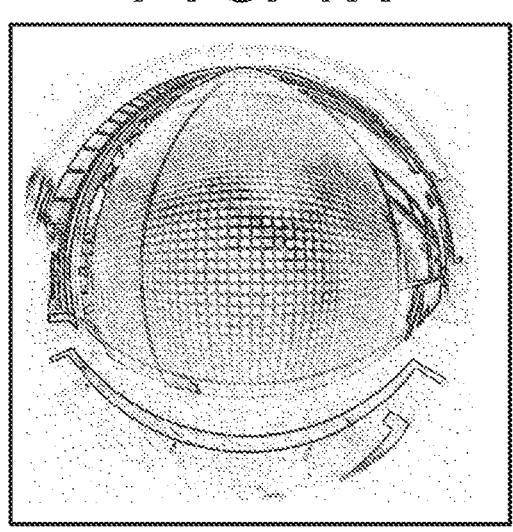
FIG. 7B
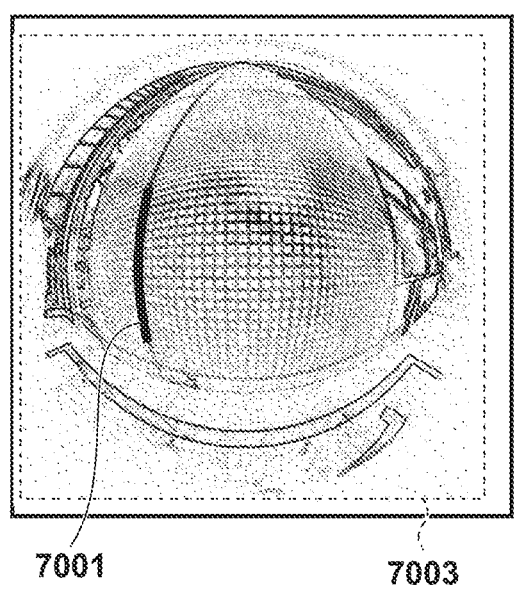
7001                    7003
FIG. 7C
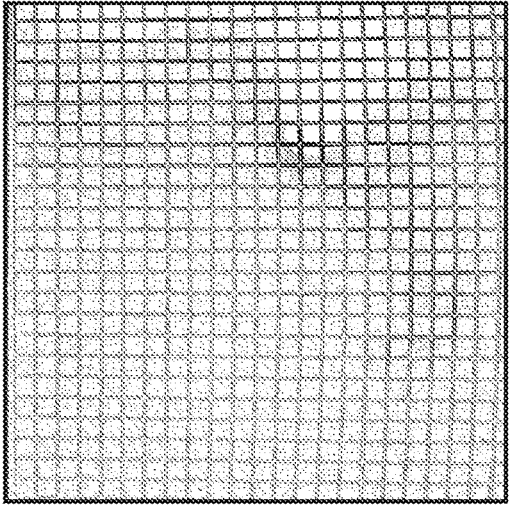
7002    # FIG. 7D
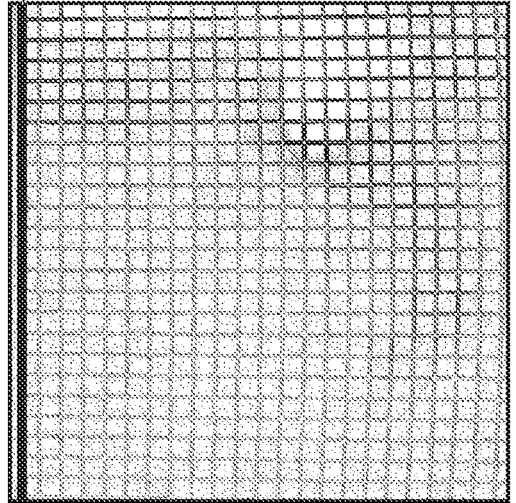

FIG. 8

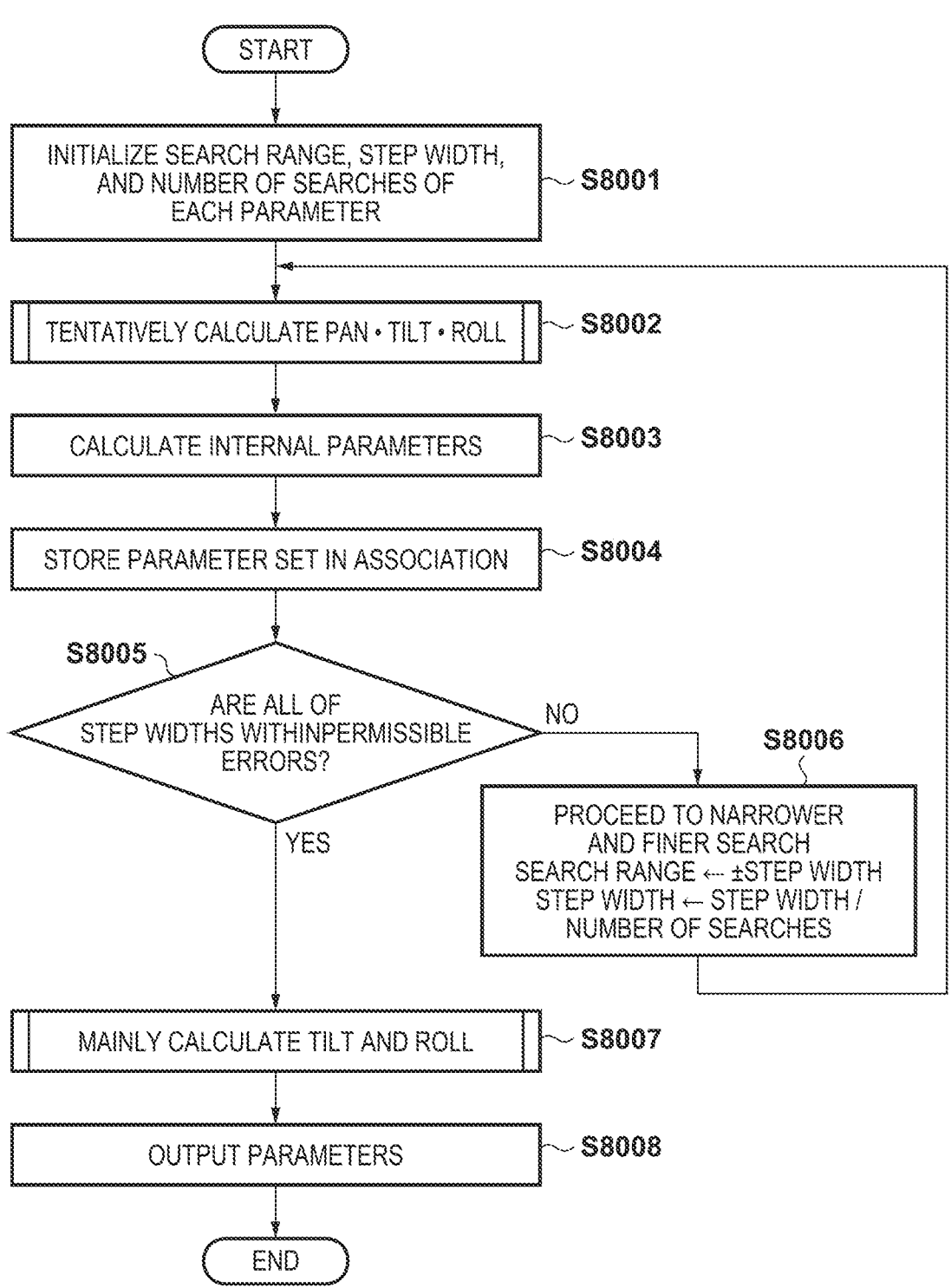

START

INITIALIZE SEARCH RANGE, STEP WIDTH,
AND NUMBER OF SEARCHES OF
EACH PARAMETER — S8001

TENTATIVELY CALCULATE PAN · TILT · ROLL — S8002

CALCULATE INTERNAL PARAMETERS — S8003

STORE PARAMETER SET IN ASSOCIATION — S8004

S8005
ARE ALL OF
STEP WIDTHS WITHINPERMISSIBLE
ERRORS?

NO

S8006
PROCEED TO NARROWER
AND FINER SEARCH
SEARCH RANGE ← ±STEP WIDTH
STEP WIDTH ← STEP WIDTH /
NUMBER OF SEARCHES

YES

MAINLY CALCULATE TILT AND ROLL — S8007

OUTPUT PARAMETERS — S8008

END

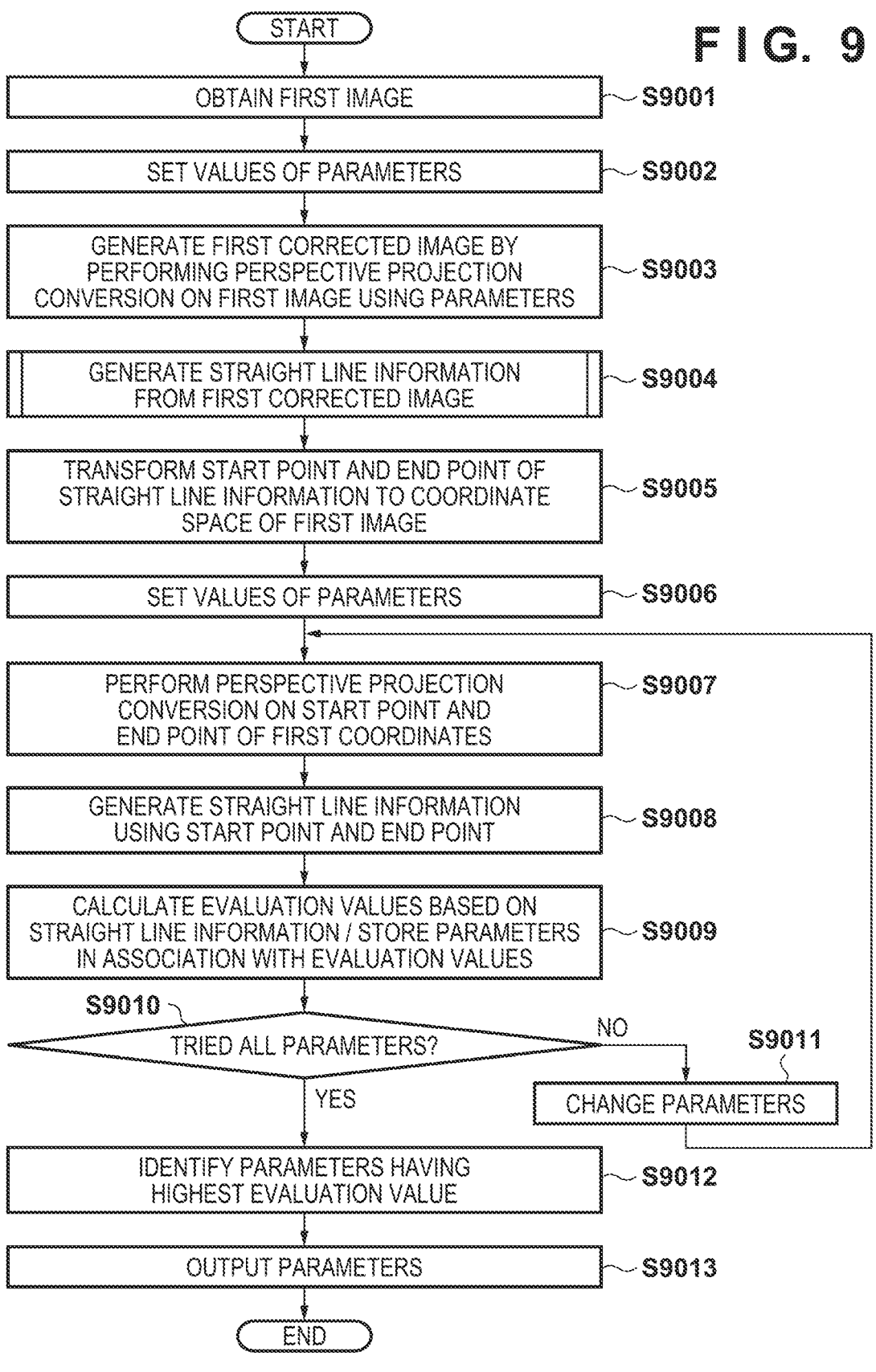
F I G.  9

F I G. 10A
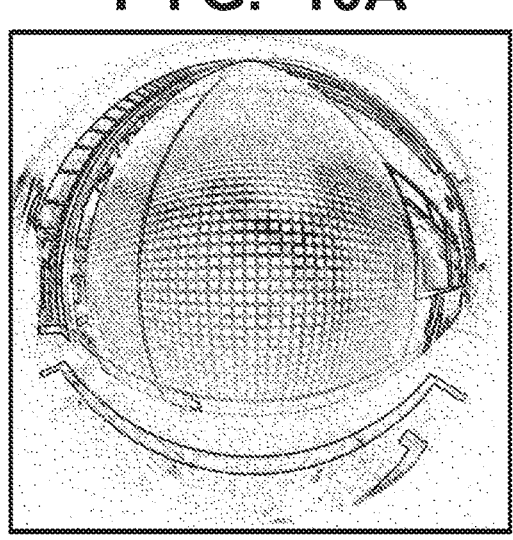
F I G. 10B
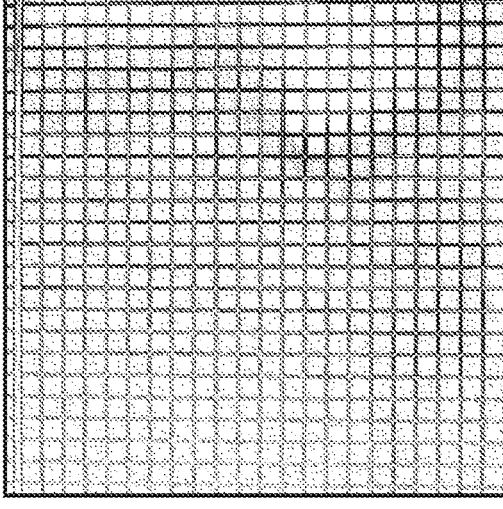
F I G. 10C
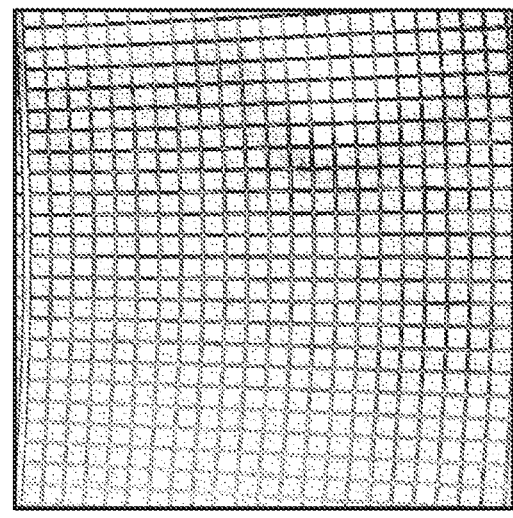

IMAGE PROCESSING APPARATUS, IMAGE PROCESSING METHOD, AND NON-TRANSITORY COMPUTER-READABLE STORAGE MEDIUM THAT GENERATE A CORRECTED IMAGE TO CORRECT DISTORTION IN A CAPTURED IMAGE

CROSS-REFERENCE TO PRIORITY APPLICATION

This application claims the benefit of Japanese Patent Application No. 2022-081071, filed May 17, 2022, which is hereby incorporated by reference herein in its entirety.

BACKGROUND OF THE INVENTION

Field of the Invention

The present invention relates to a technique for finding internal parameters of an image capturing apparatus.

Description of the Related Art

In recent years, systems that generate virtual reality (VR) images, range finding systems, and the like, that use a plurality of cameras have appeared. In such a system, generating VR images, measuring distances, and the like, requires calibration of relative positional relationships among the cameras in world coordinates (a world coordinate system).

The method disclosed in Japanese Patent Laid-Open No. 2017-211200 detects an edge from an image, calculates an incline of the detected edge, and calculates an angle of attachment of a camera based on the calculated incline of the edge. This makes it possible to implement a system for correctly generating VR images, measuring distances, and the like, by calibrating the relative positional relationships among the plurality of cameras. Even if the system only includes a single camera, an image can be corrected as if it were an image shot with the camera mounted horizontally, which can reduce a sense of discomfort caused by camera incline.

However, the method of Japanese Patent Laid-Open No. 2017-211200 is intended to calculate incline, which is an external parameter, and cannot calculate internal parameters. Internal parameters include optical axis offset between a lens and an image sensor, magnification, and distortion. If the internal parameters are incorrect, the external parameters cannot be calculated correctly. This is because distortion cannot be properly corrected when the internal parameters are incorrect, which causes straight lines in the image to bend and makes it impossible to correctly calculate angles based on the incline of edges. This makes it difficult to correctly calibrate external parameters when the internal parameters change due to factors such as thermal expansion.

SUMMARY OF THE INVENTION

The present invention provides a technique for finding internal parameters of an image capturing apparatus based on an image shot by the image capturing apparatus.

According to the first aspect of the present invention, an image processing apparatus comprises a generation unit configured to generate a corrected image in which distortion in a captured image shot by an image capturing apparatus is corrected, and an obtainment unit configured to obtain an internal parameter of the image capturing apparatus based on a straight line edge in the corrected image.

According to the second aspect of the present invention, an image processing method comprises generating a corrected image in which distortion in a captured image shot by an image capturing apparatus is corrected, and obtaining an internal parameter of the image capturing apparatus based on a straight line edge in the corrected image.

According to the third aspect of the present invention, a non-transitory computer-readable storage medium having stored therein a program for causing a computer to function as a generation unit configured to generate a corrected image in which distortion in a captured image shot by an image capturing apparatus is corrected, and an obtainment unit configured to obtain an internal parameter of the image capturing apparatus based on a straight line edge in the corrected image.

Further features of the present invention will become apparent from the following description of exemplary embodiments with reference to the attached drawings.

BRIEF DESCRIPTION OF THE DRAWINGS

FIG. 2 is a flowchart illustrating processing performed by the image processing apparatus.

FIG. 5A is a diagram illustrating a horizontal field of view of the first image.

FIG. 5B is a diagram illustrating a horizontal field of view of the first corrected image.

FIG. 5C is a diagram illustrating a horizontal field of view of the second corrected image.

FIG. 5D is a diagram illustrating a horizontal field of view of the third corrected image.

FIG. 6A is a diagram illustrating an example of a first image.

FIG. 6B is a diagram illustrating an example of a first image.

FIG. 6C is a diagram illustrating an example of a first corrected image.

FIG. 6D is a diagram illustrating an example of a first corrected image.

FIG. 7A is a diagram illustrating an example of a first image.

FIG. 7B is a diagram illustrating an example of a first image.

FIG. 7C is a diagram illustrating an example of a first corrected image.

FIG. 7D is a diagram illustrating an example of a first corrected image.

FIG. 8 is a flowchart illustrating processing performed by the image processing apparatus.

FIG. 9 is a flowchart illustrating details of the processing of step S8002.

FIG. 10A is a diagram illustrating an example of a first image.

FIG. 10B is a diagram illustrating an example of a first corrected image.

FIG. 10C is a diagram illustrating an example of a first corrected image.

DESCRIPTION OF THE EMBODIMENTS

Figure 1:
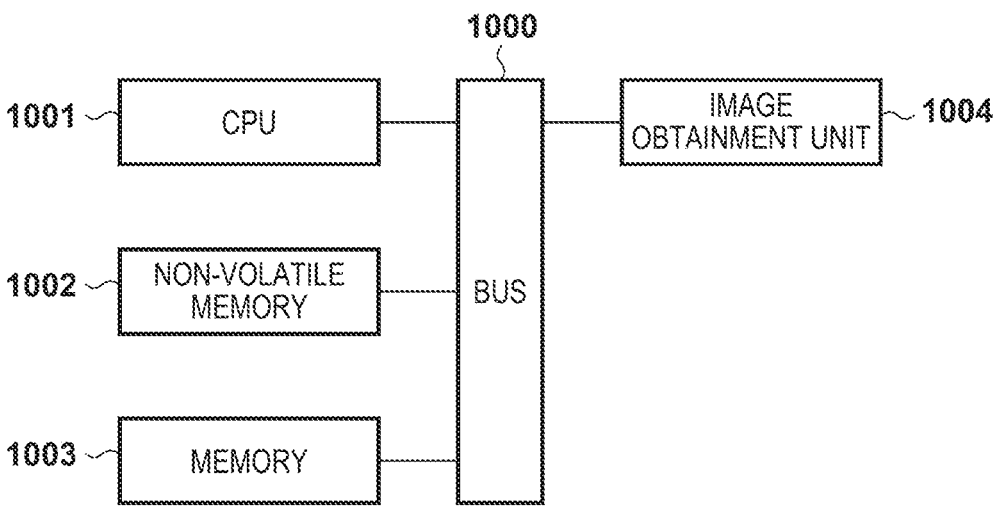
FIG. 1 is a block diagram illustrating an example of the hardware configuration of an image processing apparatus.

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and a redundant description thereof is omitted.

First Embodiment

The present embodiment will describe an image processing apparatus that finds internal parameters of an image capturing apparatus using a captured image shot by the image capturing apparatus. First, an example of the hardware configuration of the image processing apparatus according to the present embodiment will be described with reference to the block diagram in FIG. 1. A computer device such as a PC (personal computer), a smartphone, a tablet terminal device, or the like, can be applied as the image processing apparatus according to the present embodiment.

A CPU 1001 executes various types of processing using computer programs, data, and the like stored in a memory 1003. Through this, the CPU 1001 controls the operations of the image processing apparatus as a whole, and executes or controls various types of processing performed by the image processing apparatus.

A non-volatile memory 1002 is a high-capacity information storage device such as a hard disk drive device, or the like. An operating system (OS), computer programs and data for causing the CPU 1001 to execute or to control various types of processing described as being performed by the image processing apparatus, and the like, are stored in the non-volatile memory 1002. The computer programs, data, and the like, stored in the non-volatile memory 1002 are loaded into the memory 1003 as appropriate under the control of the CPU 1001, and are then processed by the CPU 1001.

The memory 1003 includes an area for storing the computer programs, data, and the like loaded from the non-volatile memory 1002, an area for storing information such as captured images obtained by an image obtainment unit 1004, and the like. The memory 1003 further includes a work area used by the CPU 1001 when executing various types of processing. In this manner, the memory 1003 can provide various types of areas as appropriate.

The image obtainment unit 1004 obtains information such as a captured image shot by the image capturing apparatus. The method for obtaining the captured image is not limited to a specific obtainment method. For example, the image obtainment unit 1004 may obtain a captured image captured by the image capturing apparatus from the image capturing apparatus over a wired or wireless network. Additionally, the image obtainment unit 1004 may obtain the captured image from an external device that holds the captured image, over a wired or wireless network. The present embodiment assumes that the captured image obtained by the image obtainment unit 1004 is a captured image captured by an image capturing apparatus to which is mounted a lens that may have distortion.

The CPU 1001, the non-volatile memory 1002, the memory 1003, and the image obtainment unit 1004 are all connected to a bus 1000. Note that the hardware configuration that can be applied to the image processing apparatus according to the present embodiment is not limited to the configuration illustrated in FIG. 1, and can be modified or changed as appropriate.

Processing performed by the image processing apparatus for obtaining internal parameters of the image capturing apparatus using a captured image shot by the image capturing apparatus to which a lens that may have distortion is mounted will be described next with reference to the flowchart in FIG. 2.

In step S2001, the CPU 1001 obtains, as a first image, a captured image shot by the image capturing apparatus to which a lens that may have distortion is mounted, which is input from the exterior via the image obtainment unit 1004. An example of the first image is illustrated in FIG. 10A. The first image illustrated in FIG. 10A is a captured image in which a building appears in the center and white lines of a road appear on the ground, and because the captured image was shot using an image capturing apparatus to which a fisheye lens having an angle of view of one hundred eighty degrees is mounted, the image is heavily distorted. Accordingly, the edges of objects appearing in the captured image, such as the building, the white lines, and the like, are heavily distorted.

In step S2002, the CPU 1001 sets appropriate values as initial values of the internal parameters. To provide specific descriptions, the present embodiment will describe the internal parameters as being optical axis offset and/or magnification, but the internal parameters are not limited thereto.

"Optical axis offset" refers to a shift amount in the X (horizontal) direction or the Y (vertical) direction of the image sensor relative to the lens. Meanwhile, "magnification" refers to a shift amount in the Z (front/rear) direction of the image sensor relative to the lens, and the size of the image changes according to the shift amount. Furthermore, there are situations where the image sensor has different magnifications in the X direction and the Y direction due to the image sensor tilting relative to the lens.

The CPU 1001 can set various values as the initial values of the internal parameters, such as design values, values calculated through other calibration methods when the apparatus is shipped from the factory, zero values, values of the internal parameters obtained from previous instances of processing, and the like. It is assumed here that internal parameters not to be obtained have already been calculated through another method when the apparatus was shipped from the factory, and have not changed. For example, in the present embodiment, the coefficient of distortion (or the relationship between the image height and the angle of view) is a fixed value calculated when the apparatus is shipped from the factory. Additionally, although the present embodiment does not discuss the calibration of the external parameters of the image capturing apparatus, if the external parameters are known in advance, they are set in step S2002.

In step S2003, the CPU 1001 generates a first corrected image in which the distortion in the first image is corrected based on the internal parameters. For example, the CPU 1001 generates the first corrected image by performing perspective projection conversion on the first image using the internal parameters.

For example, if, in step S2002, the values of pan, tilt, and roll, which are the external parameters, are set to values other than 0 degrees (as in a second embodiment, and the like), the perspective projection conversion in step S2003 is a perspective projection conversion accompanied by a viewpoint conversion (angle conversion). FIGS. 10B and 10C illustrate an example of the first corrected image obtained by performing perspective projection conversion on the first image illustrated in FIG. 10A. Processing for generating the first corrected image in step S2003, such as performing perspective projection conversion involving viewpoint conversion on a captured image captured using a fisheye lens and generating the first corrected image, is well-known processing, and will therefore not be described. In FIGS. 10A to 10C, the horizontal viewing angle is set to ninety degrees, and thus as indicated in FIGS. 10B and 10C, the directions to the sides are not visible, and only the tiles of the building in front appear.

In step S2004, the CPU 1001 generates, from the first corrected image, straight line information in which is registered information pertaining to straight line-shaped edges in the first corrected image (straight line edges; also sometimes called simply "straight lines" hereinafter). The processing of step S2004 will be described in detail later.

In step S2005, the CPU 1001 obtains an evaluation value for the internal parameters based on the straight line information generated in step S2004, and stores the internal parameters in association with the evaluation value of the internal parameters in the memory 1003. The processing of step S2005 will be described in detail later.

In step S2006, the CPU 1001 determines whether the processing of steps S2003 to S2005 has been performed for all the internal parameters. If the result of this determination indicates that the processing of steps S2003 to S2005 has been performed for all the internal parameters, the sequence moves to step S2008. On the other hand, if there are still internal parameters for which the processing of steps S2003 to S2005 has not been performed, the sequence moves to step S2007.

In step S2007, the CPU 1001 sets other values as the values of the internal parameters. For example, the CPU 1001 may use a grid search to select other values as optical axis offsets or magnification values, which are internal parameters, or may select the values through an optimization method performed based on the evaluation values. Newton's method, the Levenberg-Marquardt method, and the Monte Carlo method are examples of optimization methods. Normally, a range of variation defined by design values or measurements is set as the search range, the search granularity is defined to divide the search range into several to several tens of segments, after which the internal parameters are changed. For example, if the optical axis offset is represented by X (the amount of shift in the X (horizontal) direction of the image sensor relative to the lens) and Y (the amount of shift in the Y (vertical) direction of the image sensor relative to the lens), a search range of the initial values #100 pixels is varied at a search granularity of ten pixels. For example, if the magnification is represented by X (magnification in the X direction) and Y (magnification in the Y direction), a search range of the initial values±5% is varied at a search granularity of 1%. In this case, in step S2006, the CPU 1001 determines whether the processing of steps S2003 to S2005 has been performed for the value of each internal parameter within the search range. Normally, all internal parameters are swept by increasing the search granularity in units from the minimum to maximum values in the search range. For example, when the search range of ±100 pixels is tried at a particle size of ten pixels for the optical axis offset X and Y, the result is twenty one for each of the optical axis offset X and Y. However, with a grid search, if the processing of steps S2003 to S2005 is repeated 212, that is, four hundred forty-one times, the sequence moves to step S2008.

Then, if the processing of steps S2003 to S2005 has been performed for the value of each internal parameter within the search range, the sequence moves to step S2008. On the other hand, if there are still internal parameters within the search range for which the processing of steps S2003 to S2005 has not been performed, the sequence moves to step S2007. This processing makes it possible to obtain evaluation values for various internal parameters (i.e., various candidate parameters that are correct candidates for the internal parameters of the image capturing apparatus).

In step S2008, the CPU 1001 identifies (obtains) the internal parameters having the highest evaluation value among the internal parameters stored in the memory 1003 as the correct internal parameters for the internal parameters of the image capturing apparatus (correct internal parameters).

In step S2009, the CPU 1001 outputs the correct internal parameters obtained in step S2008 as internal parameters of the image capturing apparatus at the time of shooting the first image obtained in step S2001. Note that the output destination of the correct internal parameters is not limited to any specific output destination. For example, the CPU 1001 may cause the correct internal parameters to be displayed in a display screen using text, an image, or the like, or may send the correct internal parameters to an external device. Alternatively, the CPU 1001 may update (calibrate) the parameters managed as the internal parameters of the image capturing apparatus to the correct internal parameters obtained at this time, correct the captured image input thereafter using the correct internal parameters, and perform various types of processing using the captured image obtained from the correction. Additionally, the CPU 1001 may output the correct internal parameters along with other internal parameters that have not changed, and may output the external parameters as well.

As illustrated in FIG. 10B, the first corrected image obtained by performing perspective projection conversion on the first image in FIG. 10A using the correct internal parameters indicates that the tile boundaries (straight lines) are straight, and that the correct internal parameters are correct as the internal parameters of the image capturing apparatus.

As illustrated in FIG. 10C, the first corrected image obtained by performing perspective projection conversion on the first image in FIG. 10A using incorrect internal parameters (internal parameters that are not the correct internal parameters) indicates that the tile boundaries (straight lines) are not straight, and that the incorrect internal parameters are incorrect as the internal parameters of the image capturing apparatus. The first corrected image illustrated in FIG. 10C is an example of a case when the X optical axis offset is shifted, and mainly the vertical lines are curved, but the straight lines will be curved in some way when the Y optical axis offset, the magnification, or the like, is shifted as well.

In the present embodiment, the external parameters are not subject to calculation and thus are basically not changed. However, the optical axis offset appears as a shift in the incline at a glance, and the amount of movement within the captured image is similar. In particular, when the first image is a captured image shot using an equidistant projection lens, the angle of view per pixel is generally known, although this also depends on distortion. Because of this, the incline may be shifted in the opposite direction by an amount equivalent to the shift in the optical axis offset. For example, if the angle of view per pixel is 0.1 degrees, and the X optical axis offset has been shifted by one pixel, the pan may be shifted by 0.1 degrees in the opposite direction. In this manner, the range appearing in the first corrected image does not change much, and only the distortion changes. The same applies to the combination of the Y optical axis offset and the tilt. At this time, the optical axis offset and the incline are changed simultaneously as a single parameter, rather than being searched for as parameters of different dimensions. Although the incline changed together here is not subject to calculation, the incline may be output together or discarded in the output performed in step S2009. When an equidistant projection lens is not used, the angle of view per pixel will vary depending on the position in the captured image, but the range appearing in the first corrected image can be prevented from changing much by changing the incline opposite relative to the optical axis offset using an average value, a median value, or the like.

Figure 3:
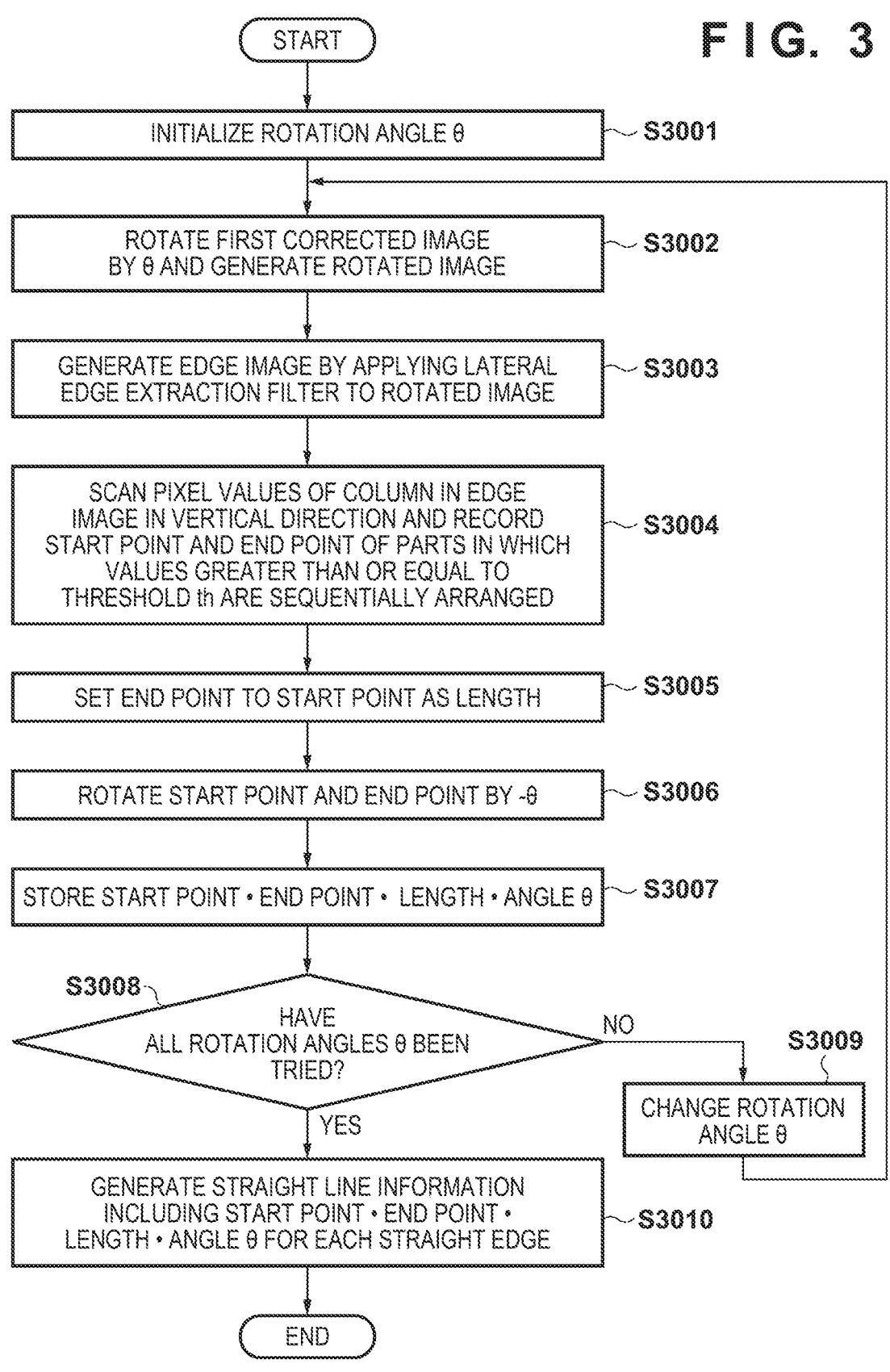
FIG. 3 is a flowchart illustrating details of the processing of step S2004.

Processing performed in the aforementioned step S2004, i.e., processing for obtaining the straight line information from the first corrected image, will be described in detail next with reference to the flowchart in FIG. 3. In step S3001, the CPU 1001 initializes a rotation angle θ to an appropriate value, such as zero or a minimum value. At this time, either the clockwise or counterclockwise direction of rotation may be taken as the positive direction, but the following descriptions will assume the counterclockwise direction is the positive direction.

In step S3002, the CPU 1001 generates a rotated image in which the first corrected image has been rotated by the rotation angle θ about the rotational center, with the center position of the first corrected image serving as the rotational center.

In step S3003, the CPU 1001 applies a lateral edge extraction filter to the rotated image and generates an edge image representing an edge component of the rotated image. The edge extraction filter is, for example, a Sobel filter, and the filter size is, for example, 3×3.

In actuality, the CPU 1001 applies the lateral edge extraction filter to a rectangular image containing the rotated image and generates an edge image representing an edge component of the rectangular image. When applying a lateral edge extraction filter to such a rectangular image, the processing may be performed as special processing for edges, such that a boundary with an image region aside from the rotated image (a triangular image region) within the rectangular image is not taken as an edge. Note that the rectangular image may be the same size as the first corrected image, and, in this case, the image region extending outside the rectangular image in the rotated image is an image region to which the edge extraction filter is not applied. In addition, if a falling edge has been extracted, the Sobel filter outputs a negative value, and it is preferable to keep that value as-is. Additionally, the edge extraction filter is not limited to a Sobel filter, and a Laplacian filter or another edge extraction filter may be used instead. Processing such as normalizing, improving the detection accuracy, preventing false positives, and the like, may be inserted before and after the processing using the edge extraction filter. For example, non-maximum suppression may be inserted in a later stage.

In step S3004, the CPU 1001 stores, in the memory 1003, coordinate values (a pixel position) at one end (a start point) and coordinate values (a pixel position) at the other end (an end point) of a pixel series (straight line edge) in which pixels having pixel values greater than or equal to a threshold th (pixels constituting the edge) are sequentially arranged, for each vertical pixel column in the edge image. The threshold th varies from image to image, and this also depends on the edge extraction filter used, but may be a value 5% to 50% of a saturation value of 100% for the pixel value, when a 3×3 Sobel filter is used. Additionally, when the result of the Sobel filter is negative, the same processing may be performed having reversed the sign of the pixel value in the edge image.

In step S3005, the CPU 1001 obtains, for each straight line edge, a distance between the start point and the end point of the straight line edge (an absolute value of the difference between the y-coordinate value of the start point and the y-coordinate value of the end point in the straight line edge) as the length of the straight line edge.

In step S3006, the CPU 1001 obtains coordinate values obtained by rotating the coordinate values of the start point of the straight line edge by a rotation angle (−θ), taking the center of the rotated image as the rotational center. Similarly, the CPU 1001 obtains coordinate values obtained by rotating the coordinate values of the end point of the straight line edge by a rotation angle (−θ), taking the center of the rotated image as the rotational center. In other words, the CPU 1001 finds the coordinate values in the first corrected image corresponding to the coordinate values at the start point and the end point of the straight line edge in the rotated image. Since it is problematic to have a negative value for the rotation angle θ, the following descriptions will take the rotation angle θ as being in the clockwise direction.

In step S3007, the CPU 1001 stores, in the memory 1003, a set of the coordinate values obtained in step S3006, the length of the straight line edge obtained in step S3005, and the rotation angle θ, for both the start point and the end point of the straight line edge, for each straight line edge. Note that the set may not be generated for straight line edges having a short length. For example, the set need not be generated for a straight line edge having a length of fewer than five pixels, a straight line edge having a width or height of less than 5% of the rotated image, or the like.

In step S3008, the CPU 1001 determines whether the processing of steps S3002 to S3007 has been performed for all rotation angles θ. If the result of this determination indicates that the processing of steps S3002 to S3007 has been performed for all rotation angles θ, the sequence moves to step S3010. On the other hand, if a rotation angle θ for which the processing of steps S3002 to S3007 has not been performed remains, the sequence moves to step S3009.

In step S3009, the CPU 1001 updates the rotation angle θ. For example, because the range over which the rotation angle θ is changed is typically from zero to one hundred eighty degrees (the full circumference), the rotation angle θ is changed at a granularity of about 0.01 to 1 in the changing range of zero to one hundred eighty degrees. In this case, the processing of steps S3002 to S3007 is performed for each rotation angle θ changed at a granularity of about 0.01 to 1 in the changing range of zero to one hundred eighty degrees.

In this manner, if the vertical straight line edge is detected while rotating the first corrected image, the straight line edge in the first corrected image at various rotation angles can be detected. For example, when the first corrected image illustrated in FIG. 4B is generated from the first image illustrated in FIG. 4A, when the first corrected image is rotated such that a vertical line of the window frame is approximately vertical, the vertical line of the window frame is detected as a straight line edge. Meanwhile, when the rotation angle θ at this time is further increased by ninety degrees, the horizontal line of the window frame is detected as a vertical straight line edge. The word "approximately" is used because the internal parameters set in step S2002 are actually not correctly corrected for distortion, and thus distortion remains, the straight line is curved, and a single straight line edge is not correctly detected. If the correct internal parameters can be set in step S2007, a straight line can be correctly detected as a single straight line edge. In step S3010, the CPU 1001 generates straight line information in which is registered the set for each straight line edge stored in the memory 1003 in step S3007.

The processing of the aforementioned step S2005 will be described in detail later. The CPU 1001 obtains, as an evaluation value, a sum of the results of multiplying the lengths of the respective straight line edges registered in the straight line information by n (where n is a real number greater than or equal to 1, and n=2 in the present embodiment, as an example). A higher evaluation value indicates that the length of the straight line edge is longer. Accordingly, the method for obtaining the evaluation value is not limited to a specific method, as long as a higher evaluation value is obtained as the total of the lengths of the straight line edges registered in the straight line information increases.

The internal parameters being incorrect as the actual internal parameters of the image capturing apparatus indicates that the distortion correction has not been performed correctly in the perspective projection conversion performed in step S2003, and distortion remains in the first corrected image. This appears as items that should appear as straight lines instead appearing to be curved. When the internal parameters are incorrect as the actual internal parameters of the image capturing apparatus and straight lines appear curved, a single, long straight line edge cannot be extracted in step S3004, and a plurality of short straight line edges are extracted instead. A high evaluation value cannot be obtained in this case. For example, with the first corrected image illustrated in FIG. 10C, lines that should appear as straight lines in the first corrected image are instead curved, and thus a high evaluation value is not obtained.

On the other hand, if the internal parameters are correct as the internal parameters of the image capturing apparatus, the distortion correction is performed correctly in the perspective projection conversion performed in step S2003, and lines that should appear as straight lines appear as straight lines and are extracted as a single, long straight line edge in step S3004. If a long straight line is present, a high evaluation value is obtained. For example, with the first corrected image illustrated in FIG. 10B, lines that should appear as straight lines in the first corrected image are not curved extensively, and thus a high evaluation value is obtained.

By obtaining the evaluation value in this manner, internal parameters that produce the highest evaluation value can be determined to be correct as the actual internal parameters of the image capturing apparatus. Note that if n is too small, the evaluation value will be high even if there are many short straight line edges. On the other hand, if n is too large, edges that are not actually straight line edges will be unintentionally taken as straight line edges despite the internal parameters being incorrect, and, in such a case, a high evaluation value will be obtained from the incorrect internal parameters. From the standpoint of preventing such misidentification, it is preferable for n to be 2 to 3.

In practice, even if the internal parameters are correct, long straight lines are extracted as a single long straight line edge at the correct angle, and are also detected as a plurality of short straight line edges at slightly shifted angles. Because of this, as described above, straight line edges of short lengths are not included in the straight line information.

However, the short straight line edges have a limited effect on the evaluation value, and thus the evaluation value may nevertheless be included in the calculation. Alternatively, processing for excluding short straight line edges that overlap a long straight line edge may be added. Or, the top several to several hundred lengths may be subject to the addition, and shorter straight line edges may be excluded.

Note that, in the present embodiment, only the length of the straight line edge among the information included in the straight line information is used, and thus the other information need not be included in the straight line information, and need not be calculated in the first place. In the case of the present embodiment, step S3006 in FIG. 3 may be omitted, the lengths of the respective straight line edges may be stored in the memory 1003 in step S3007, and the straight line edges including the lengths of the respective straight line edges may be generated in step S3010.

Additionally, in the present embodiment, the evaluation value may be found using another calculation method as long as the evaluation value indicates whether the straight line in the first corrected image is straight or curved. Additionally, for example, incorrect magnification makes it easier for curves to arise in straight lines closer to the periphery of the image, and thus weights may be given in accordance with the positions of the start point and the end point. For example, a plurality of straight lines may be integrated as a curve using an angle to obtain a curvature factor at each position on the curve, and an evaluation value may be defined based on the curvature factor to have a higher value the straighter the line is.

Here, "long straight lines" are usually present in man-made objects such as buildings or pillars. However, if a man-made object is not present, there are few, if any, things that "should be a straight line," or even if such things are present in the image, only short straight lines may be present. In this case, even if the correct internal parameters can be set, a high evaluation value cannot be obtained. In other words, even if the internal parameters providing the highest evaluation value are selected, the parameters may still not be correct. Because of this, if the evaluation value does not reach at least a constant level, the internal parameter identification (calculation, calibration) processing may be canceled, and a failure notification may be output. For example, an evaluation value for three straight line edges having a length 50% of the width of the image not being reached may be handled as a failure.

Conversely, the present embodiment may be applied only when an item which "should be a straight line" as determined by a human appears in the image. If no item that "should be a straight line" appears, even if the internal parameters are somewhat incorrect, there will be no problem in terms of appearance. Things that are originally curved like trees and people will not appear unnatural unless the internal parameters are highly incorrect and produce strange types of curves. Considering this, when a failure has occurred, the design values, factory settings, the results of the previous calculations, or the like, may be used as the internal parameters. Incidentally, shifts in the optical axis offset and shifts in the magnification may result in similar changes when focusing on a specific single line.

Assume that internal parameters that are correct (the correct internal parameters) have been obtained based on the first image illustrated in FIG. 6A. FIG. 6C illustrates an example of the first corrected image obtained by correcting distortion in the first image using the correct internal parameters. In FIG. 6B, a bold line 6001 indicates a corresponding part corresponding to a location where there is a gap between tiles in the first image illustrated in FIG. 6A. In FIG. 6D, a bold line 6002 indicates a corresponding part corresponding to a location where there is a gap between tiles in the first corrected image illustrated in FIG. 6C, and corresponds to the aforementioned bold line 6001.

It is assumed that the correct internal parameters have been obtained based on the first image in FIG. 7A, using the correct internal parameters obtained based on the first image in FIG. 6A as initial values. FIG. 7C illustrates an example of the first corrected image obtained by correcting distortion in the first image illustrated in FIG. 7A using the correct internal parameters. In FIG. 7B, a bold line 7001 indicates a corresponding part corresponding to a location where there is a gap between tiles in the first image illustrated in FIG. 7A. In the first image illustrated in FIG. 7A, the magnification (uniform for X and Y) is lower than in the first image illustrated in FIG. 6A, and thus the X magnification offset is shifted to the left. The dotted line frame 7003 in FIG. 7B corresponds to a frame prior to reduction and offset shift (the first image in FIG. 6A). Here, FIG. 7A is intentionally created as such, but such a change can actually occur due to thermal expansion, vibrations, or the like. In FIG. 7D, a bold line 7002 indicates a corresponding part corresponding to a location where there is a gap between tiles in the first corrected image illustrated in FIG. 7C, and corresponds to the aforementioned bold line 7001.

Although the image illustrated here mainly shows tiles of a building, and although many straight lines could originally be detected, to simplify the descriptions, it will be assumed that the image contains only straight lines corresponding to the bold line 6002 and the bold line 7002, and no other straight lines are present.

The straight line indicated by the bold line 6002 can be detected as a straight line edge having a length extending from the top end to the bottom end of the image. This straight line edge is long and therefore increases the evaluation value. Meanwhile, the straight line indicated by the bold line 7002 is almost the same, and can be detected as a straight line edge of a similar length. This straight line edge also increases the evaluation value.

In FIG. 7C, the straight line edge corresponding to the bold line 7002 is straight and provides a high evaluation value, despite having been generated using a clearly erroneous magnification and X optical axis offset. The first image illustrated in FIG. 7A has been shifted to the left as a result of reducing the first image illustrated in FIG. 6A, and thus the first corrected image illustrated in FIG. 6C can be generated by correcting the distortion in the first image illustrated in FIG. 7A by providing a corresponding magnification and optical axis offset. However, since a high evaluation value has also been obtained in FIG. 7C, it is unlikely that internal parameters which can generate the image in FIG. 6C will be reached.

Furthermore, even if several lines can be detected on the right side of the straight line 7002 in FIG. 7C, those lines do not appear to be very curved. However, the line near the right end of the image is curved. Assuming that a line near the right end of the image is present, if the line can be detected, the first corrected image in FIG. 6C, which is not curved, provides a higher evaluation value than the first corrected image in FIG. 7C, in which the line at the right end is curved.

Although the magnification and X optical axis offset in the first image in FIG. 7A are shifted with respect to the first image in FIG. 6A, the bold line 6001 and the bold line 7001 are in approximately the same position, and the way in which the distortion manifests is almost the same as well. In this manner, when focusing only on a specific line, a line for which the magnification is shifted can be returned to its original position by shifting the offset, and thus the distortion can be roughly corrected. The reverse is also true. If the shift is too extensive, the way in which the distortion manifests will of course change, but if the change is within a certain range, the relationship between the X optical axis offset and the magnification that produces a high evaluation value will become a direct function, and if no change occurs due to errors caused by noise, or the like, any combination within the range will be acceptable.

Incidentally, although the foregoing descriptions discuss using shift in the X direction, the same applies to the Y direction as well. As a result, it is difficult to calculate the optical axis offset and the magnification at the same time unless at least two lines are present at at least a constant distance. When calculating the X optical axis offset and the X magnification, it is sufficient to assume that at least two lines that are x pixels apart in the horizontal direction (where x is about 40 to 80% of the width of the first corrected image) are necessary. When calculating the Y optical axis offset and the Y magnification, it is sufficient to assume that at least two lines that are y pixels apart in the vertical direction (where y is about 40% to 80% of the height of the first corrected image) are necessary. If these conditions are not met, a failure notification is output.

Or, conversely, if a line is fixed on one side and there is no line on the opposite side, the side on which an item which "should be a straight line" as determined by a human will not appear unnatural even if there is some curvature, even when incorrect. As such, when there is no distant line, if high evaluation values are competing among multiple combinations of internal parameters, the combination having the smallest difference from the initial values in step S2008 may be selected. This is because, if the combination providing the highest evaluation value is selected, a combination different from the true correct combination may be selected due to error caused by noise. In this manner, according to the present embodiment, internal parameters that vary depending on thermal expansion, vibration, or the like, of the image capturing apparatus can be calculated/specified for each image that is shot.

Second Embodiment

The following embodiments, including the present embodiment, will focus on the differences from the first embodiment, and items not mentioned explicitly in the following are assumed to be the same as in the first embodiment. In the present embodiment, external parameters that are correct as the actual external parameters of the image capturing apparatus are obtained in addition to the internal parameters that are correct as the actual internal parameters of the image capturing apparatus. In the present embodiment, the internal parameters and the external parameters are obtained in parallel, instead of obtaining the external parameters after obtaining the internal parameters. In the present embodiment, the image processing apparatus performs processing obtained by changing the processing illustrated in the flowchart in FIG. 2 as follows.

In step S2002, the CPU 1001 sets initial values of the external parameters, in addition to the internal parameters. The tilt and the roll of the image capturing apparatus are used as the external parameters in the present embodiment, as an example. The incline of the image capturing apparatus basically matches the direction of gravity, and thus pan is not handled here.

In step S2004, the straight line information is generated using one of an angle scanning method 1 and an angle scanning method 2. The angle scanning method 1 is a method for generating the straight line information as illustrated in the flowchart in FIG. 3, as in the first embodiment. The angle scanning method 2 is a method for generating the straight line information by omitting steps S3008 and S3009 in the flowchart in FIG. 3, and performing the processing of steps S3002 to S3007 and S3010 only for the rotation angle $\theta=0$.

In step S2005, the CPU 1001 obtains an evaluation value based on the straight line information generated in step S2004, and stores a set of the external parameters, the internal parameters, and the evaluation value in the memory 1003.

In step S2007, the CPU 1001 updates the external parameters in addition to the internal parameters. The updating of the external parameters is varied at an appropriate search granularity within a search range for the external parameters, in the same manner as when updating the internal parameters.

Then, in step S2006, the CPU 1001 determines whether the processing of steps S2003 to S2005 has been performed for all of the internal parameters and all of the external parameters. If the result of this determination indicates that the processing of steps S2003 to S2005 has been performed on all of the internal parameters and all of the external parameters, the sequence moves to step S2008. On the other hand, if there are still internal parameters or external parameters for which the processing of steps S2003 to S2005 has not been performed, the sequence moves to step S2007.

In step S2008, the processing for obtaining the internal parameters and the external parameters differs depending on whether the CPU 1001 has used the angle scanning method 1 or the angle scanning method 2 to generate the straight line information in step S2004.

Processing performed in step S2008 when the straight line information is obtained using the angle scanning method 1 in step S2004 will be described first. In the present embodiment, internal parameters for preventing the lines appearing in the captured image from curving, and external parameters for preventing the straight lines from being inclined, are to be calculated.

First, the CPU 1001 obtains the nth power (where n is 2 to 3) of the lengths of the respective straight line edges included in the straight line information as length evaluation values of the straight line edges. Next, because the external parameters are to be calculated here, the CPU 1001 imposes a penalty on straight line edges that are tilted relative to the vertical direction in the image. The evaluation value should be highest when the straight line edge is parallel to the vertical direction of the image (is vertical), and the evaluation value should be lower as the straight line edge is further tilted from the vertical direction. Specifically, the CPU 1001 normalizes the angle $\theta$ of the straight line edge relative to the vertical direction in the image to $-90 \leq \theta < 90$, and defines an angle evaluation value such that the value decreases as an angle difference from the vertical direction ($\theta=0$) in the image increases. For example, the CPU 1001 obtains $(90-|\theta|)/90$ as the angle evaluation value. When the angle difference is 0, the angle evaluation value is 1. The CPU 1001 then obtains the evaluation value by calculating the following formula.

$$\text{Evaluation value} = \Sigma(\text{length evaluation value} \times \text{angle evaluation value})$$

$\Sigma$ represents the sum of the product of the length evaluation value and the angle evaluation value for each straight line edge. As a result of this calculation, a higher evaluation value is obtained when there are more straight line edges that are long (not curved) and not tilted. The combination of the internal parameters and the external parameters corresponding to the highest evaluation value is thus the correct combination of internal parameters and external parameters.

Processing performed in step S2008 when the straight line information is obtained using the angle scanning method 2 in step S2004 will be described next. Detecting the straight line edge only from the first corrected image that has not been rotated means that the straight line edge parallel to a direction shifted from the vertical direction (a tilted direction) in the first corrected image will not be detected. However, the straight line edge parallel to a direction slightly shifted from the vertical direction (the tilted direction) in the first corrected image is detected as a plurality of short straight line edges. Accordingly, when a long straight line edge is detected from the first corrected image that has not been rotated, that straight line edge is a straight line edge which is not shifted (not inclined) relative to the vertical direction in the first corrected image. Accordingly, the longer the straight line edge detected from the first corrected image that has not been rotated is, the higher the evaluation value becomes. For example, a result of multiplying the lengths of the respective straight line edges detected from the first corrected image which has not been rotated by n (where n is a real number greater than or equal to 1; n=2, in the present embodiment) and totaling the resulting products is taken as the evaluation value.

Then, in step S2008, the CPU 1001 specifies (obtains) the external parameters and the internal parameters in a set, among the sets stored in the memory 1003, that includes the highest evaluation value, as external parameters that are correct as the external parameters of the image capturing apparatus (correct external parameters) and internal parameters that are correct as the internal parameters of the image capturing apparatus (correct internal parameters).

The processing for rotating the first corrected image in step S3002 is an affine transformation. If a one hundred eighty-degree range is to be scanned at a granularity of 0.1 degrees or the like, it is necessary to perform eighteen hundred affine transformations, which results in a heavy processing load in a single loop of steps S2003 to S2005 and S2007. However, if the angle scanning method 2 and the evaluation value calculation method corresponding to the angle scanning method 2 are used, the affine transformation is performed once, which makes it possible to shorten the processing time, reduce the processing load, and the like.

In this manner, according to the present embodiment, the internal parameters and the external parameters of the image capturing apparatus can be obtained in parallel. Additionally, using the angle scanning method 2 described above makes it possible to reduce the angle scanning time, which in turn makes it possible to shorten the processing time, reduce the processing load, and the like.

Note that there is no guarantee that lines on the ground are horizontal or straight. While such is not the case indoors, roads, natural ground surfaces, and the like, have inclines and curves. Because of this, it is undesirable to register information pertaining to straight line edges having taken lines on the ground as straight line edges. Accordingly, a ground determination may be provided, and information pertaining to a straight line edge determined to be a line of the ground may not be registered in the straight line information.

For example, a straight line edge in which both the start point and the end point belong to the lower half of the first corrected image is determined to be a line on the ground. Although straight line edges in which both the start point and the end point belong to the upper half of the first corrected image are also registered in the straight line information as being at positions lower than the image capturing apparatus, edges that are higher than the image capturing apparatus can be registered in the straight line information.

If, during the search, the image capturing apparatus is facing downward while the external parameters are far from the correct parameters, the ground will appear in the upper half as well. Accordingly, at the beginning of the parameter search, e.g., when the tilt search range is set to ±5%, up to a range corresponding to the top five degrees is excluded from the straight line information. As the search range narrows in a hierarchical grid search, it is preferable to narrow the upper range for exclusion.

Even when only the internal parameters are obtained, as in the first embodiment, it would be best to apply such exclusion of ground lines. However, when only the internal parameters are obtained, the direction in which the image capturing apparatus is facing cannot be determined, and thus the lower half cannot be determined to be the ground.

Third Embodiment

In the present embodiment, the external parameters and the internal parameters of the image capturing apparatus are obtained at a higher speed. In the present embodiment, the image processing apparatus performs processing illustrated in the flowchart in FIG. 8. In step S8001, the CPU 1001 sets initial values for a search range, a search granularity (step width), and a number of searches for a grid search performed to calculate the external parameters (pan, tilt, and roll) of the image capturing apparatus in step S8002 and to calculate the internal parameters in step S8003.

The search range of the grid search is normally determined as a varied range, according to design values, measurements, and the like. This corresponds to, for example, ±5 degrees for the angle, ±100 pixels for the optical axis offset, and 100+5% for the magnification.

With respect to the search granularity and the number of searches, the relationship of "width of search range=search granularity x (number of searches−1)" holds true, and thus if the search range is ±5 degrees, for example, the search granularity can be set to one degree and the number of searches can be set to eleven.

In step S8002, the CPU 1001 tentatively calculates the pan, tilt, and roll, which are the external parameters of the image capturing apparatus. The processing of step S8002 will be described in detail later. Here, the external parameters are roughly aligned before the internal parameters are calculated. In the search performed in this calculation, the search range, the search granularity, and the number of searches defined in step S8001 or step S8005 are used. Doing so makes it possible to roughly align the straight line edges, which are important hints for calculating the internal parameters, vertically or horizontally. Although the pan may be excluded from being calculated in the end, the pan is calculated temporarily and used in subsequent perspective projection conversions. Doing so not only ensures that a building is displayed standing vertically, but also ensures the building is displayed from the front. For example, as illustrated in FIG. 4B, not only are the vertical lines of the building's window frames and tiles displayed approximately vertically, but the horizontal lines are also displayed approximately horizontally. The term "approximately" is used here because, at this point, the internal parameters are still incorrect and straight lines may therefore still be curved.

In step S8003, the CPU 1001 calculates the internal parameters in the same manner as in the first embodiment. However, in the present embodiment, the range of the rotation angle θ that can be changed in step S3009 is limited to a range of 0±t degrees and 90±t degrees. t is approximately one to ten degrees. In step S8002, the vertical and horizontal lines of the building are tentatively adjusted so as to be approximately vertical and horizontal, and thus many of the straight line edges serving as hints are roughly vertical or horizontal straight line edges. Accordingly, simply detecting approximately vertical or approximately horizontal straight line edges, without scanning over all angles, provides straight line information serving as an important hint. In the search performed in this calculation, the search range, the search granularity, and the number of searches defined in step S8001 or step S8005 are used.

In step S8004, the CPU 1001 stores the external parameters (pan, tilt, and roll) tentatively calculated in step S8002 in the memory 1003 in association with the internal parameters calculated in step S8003. Note that the CPU 1001 deletes the external parameters and internal parameters previously stored in the memory 1003, and stores the external parameters and internal parameters calculated this time in the memory 1003. In other words, only the most-recently calculated external parameters and internal parameters are stored in the memory 1003.

Steps S8002 to S8006 correspond to a hierarchical grid search, and are a loop that begins with a wide and rough search and then becomes narrower and finer to improve the accuracy.

In step S8006, the processing advances to the next level in the hierarchy, where the CPU 1001 narrows the search range further from that used in steps S8002 and S8003, and further narrows the search granularity as well.

For the search range, it is possible that parameters which provide a better evaluation value are present within a range of ±the search granularity with respect to the parameters calculated in a single grid search. Accordingly, in step S8006, the CPU 1001 sets (calculated parameters #previous search granularity) as the next search range. The search granularity is set to the previous search granularity/(number of searches+1). Because the relationship of "width of search range=search granularity×(number of searches+1)" holds true, the search granularity and the number of searches may be reset taking into account the accuracy and the processing time. For example, if the previous search range is ±5 degrees, the search granularity is one degree, and the number of searches is eleven, the next time, the search range may be ±1 degree, the search granularity may be 0.2 degrees, and the number of searches may be 11.

This setting of the search range and the search granularity (narrowing the search range and refining the search granularity) is performed for each of the external parameters obtained in step S8002 and the internal parameters obtained in step S8003.

The search granularity corresponds to the calculation accuracy, and thus if the CPU 1001 determines that all of the search granularities are within the permissible error in step S8005, the sequence moves to step S8007. On the other hand, if a search granularity that is not within the permissible error remains, the CPU 1001 moves the sequence to step S8006.

Incidentally, the reason why the internal parameters are calculated in step S8003 and the external parameters are tentatively calculated again in step S8002 of the next loop in order to proceed to a narrower and finer search is that if the internal parameters are changed in step S8003, the inclination will change as well. For example, a change in the optical axis offset (X) brings about a similar change in the pan, and a change in the optical axis offset (Y) brings about a similar change in the tilt. This is because the straight line edge detected in step S8003 is limited to a straight line edge that is nearly vertical or horizontal, and may therefore fall outside of the range for detecting straight line edges. Furthermore, when the internal parameters approach the correct parameters as a result of the processing in step S8003, the lines that were curved the previous time become straighter, and the angle of the straight line edges that can be detected by the straight line edge detection in the next instance of step S8002 can be more accurately detected, which increases the accuracy of calculating the external parameters in step S8002. In this manner, calculating the external parameters in step S8002 and calculating the internal parameters in step S8003 in a single loop and executing the loop repeatedly makes it possible to increase the accuracy with which both the external parameters and the internal parameters are calculated.

In step S8007, the CPU 1001 calculates the pan, tilt, and roll, which are the external parameters of the image capturing apparatus (a main calculation), through processing similar to that of the above-described step S8002. Here, the pan is returned to the initial value, and the tilt and roll are recalculated. By performing the processing of step S8002 a number of times, a pan, tilt, and roll in which the building stands vertically and the building appears vertical are obtained. However, the pan is not actually calculated, and has merely been adjusted so as to omit the detection of straight line edges tilted more vertically and horizontally in step S8003, which means it is necessary to return the pan to its original value. The condition that the building stands vertically remains, but the condition of facing the building is unnecessary.

The processing performed in step S8007 differs depending on the order of rotation of the pan, tilt, and roll in the angle conversion involved in the perspective projection conversion. If the pan is rotated last, it is sufficient to cancel only the last rotation of the pan, and thus the tilt direction is maintained even if the pan is returned, and the building stays vertical. Accordingly, although it is not necessary to readjust the tilt and roll in step S8007, a very narrow range may be searched and fine-tuned in order to improve the accuracy. On the other hand, if the pan is rotated first, the axes of the subsequent tilt rotation and the roll rotation will change. Therefore, when the pan changes, the tilt and roll have no meaning as external parameters, and thus the building will not be standing vertically even if the values are used as-is. As such, if the pan is returned to the initial value, it is necessary to recalculate the tilt and roll. In addition, there is no need to pay attention to whether the tilt rotation or the roll rotation is first.

Additionally, there are cases when it is necessary to calibrate a plurality of image capturing apparatuses and to use a relative pan angle for calibration between the image capturing apparatuses. Although the absolute value of pan from directly in front of the building calculated in the present embodiment is unnecessary as a final output, it is useful as a relative value with respect to other image capturing apparatuses. Accordingly, when canceling the pan in step S8007, the pan may be set to an average of the initial values of the pan with the other image capturing apparatuses, and a value that maintains the relative value of the calculation result. Doing so makes it possible to align the orientations of the plurality of image capturing apparatuses without making significant changes to the direction in which the initial value is oriented. For example, assume that there are two image capturing apparatuses, one image capturing apparatus (an image capturing apparatus 1) has an initial value of one degree for the pan and the calculation result is three degrees, and the other image capturing apparatus (an image capturing apparatus 2) has an initial value of two degrees for the pan and the calculation result is five degrees. Because the average of the initial values is 1.5 degrees, and the difference between the calculation result is two degrees, the final pan can maintain the difference between the average of the initial values and the calculation result by giving 0.5 degrees for the image capturing apparatus 1 and 2.5 degrees for the image capturing apparatus 2.

In step S8008, the CPU 1001 outputs the internal parameters stored in the memory 1003 in step S8004 and the external parameters for which the main calculation is performed in step S8007 as the correct internal parameters and external parameters, respectively, of the image capturing apparatus.

The processing performed in the above-described step S8002 will be described in detail next with reference to the flowchart in FIG. 9. In step S9001, the CPU 1001 obtains, as a first image, a captured image shot by the image capturing apparatus to which a lens that may have distortion is mounted, which is input from the exterior via the image obtainment unit 1004.

In step S9002, the CPU 1001 sets the values of the processing parameters (the optical axis offset, the magnification, and the pan, tilt, and roll). For example, in the first instance of step S9002, design values or values calibrated before the apparatus is shipped from the factory are set as the values of the processing parameters, and, in the second and subsequent instances of step S9002, the values obtained in the previous instance of the processing are set.

In step S9003, the CPU 1001 generates a first corrected image in which the distortion in the first image is corrected based on the processing parameters, in the same manner as the above-described step S2003. For example, the CPU 1001 generates the first corrected image by performing perspective projection conversion on the first image using the processing parameters. In step S9004, the CPU 1001 generates the straight line information from the first corrected image in the same manner as in the above-described step S2004.

In step S9005, using the processing parameters set in step S9002, the CPU 1001 obtains the coordinates in the first image which correspond to the coordinates of the start point and end point of each straight line edge included in the straight line information generated in step S2004.

Incidentally, step S9005 appears to be an inverse transform from that in step S9003. However, generally, an output image is scanned and pixel values are extracted from the input image as the processing for converting a fisheye image, which is an example of the first image, into a perspective projection image, which is an example of the first corrected image, and thus the coordinates are converted in the same direction in the two above.

In step S9006, the CPU 1001 sets the values of the processing parameters (the optical axis offset, the magnification, and the pan, tilt, and roll), in the same manner as in the above-described step S9002. In step S9007, using the current processing parameters, the CPU 1001 obtains the coordinates in the first corrected image that correspond to the coordinates in the first image obtained in step S9005.

Incidentally, the processing of step S9007 converts, for example, from coordinates of a fisheye image (fisheye coordinates) to coordinates of a perspective projection image (perspective projection coordinates), and therefore appears to be a conversion in the same direction as the conversion of step S9003. However, in reality, the conversion of step S9007 is the inverse of the conversion of step S9003/step S9005.

Then, in step S9008, the CPU 1001 generates the straight line information again using the coordinates of the start point and the end point obtained in step S9007. In other words, the CPU 1001 generates straight line information including an angle from a vertical direction of a straight line having both the start point and the end point obtained in step S9007 as the rotation angle $\theta$, coordinates of the start point and the end point obtained in step S9007 as the coordinates of the start point and the end point, and the distance between the coordinates of the start point and the end point obtained in step S9007 as the length.

In this manner, when converting from perspective projection coordinates to fisheye coordinates and converting from fisheye coordinates to perspective projection coordinates with different parameters, the angle changes, and the rotation angle $\theta$ is therefore recalculated from the coordinates of the start point and the end point. The length also changes, but, in a calculation method 1 and a calculation method 2 for the evaluation value (described later), the length only has meaning as the reliability of the angle, and therefore need not be taken into account very much. The fact that the length at the time of straight line edge detection extends and contracts by changing the external parameters has little to do with the reliability, and thus the length at the time of straight line edge detection may be kept as-is, or the length may be recalculated from the coordinates of the start point and the end point.

In step S9009, the CPU 1001 obtains the evaluation value based on the straight line information. Unlike the first embodiment, the evaluation value here is calculated based on angles. The evaluation value calculation processing according to the present embodiment will be described in detail later. The CPU 1001 then stores the external parameters included in the processing parameters and the evaluation values obtained in this step for the processing parameters in association with each other in the memory 1003.

In step S9010, the CPU 1001 determines whether the processing of steps S9007 to S9009 has been performed for all external parameters. If the result of this determination indicates that the processing of steps S9007 to S9009 has been performed for all of the external parameters, the sequence moves to step S9012. On the other hand, if there are still external parameters for which the processing of steps S9007 to S9009 has not been performed, the sequence moves to step S9011.

In step S9011, the CPU 1001 sets other values as the values of the external parameters. New external parameters may be selected by a grid search, or through an optimization method based on the evaluation values. Newton's method, the Levenberg-Marquardt method, and the Monte Carlo method are examples of optimization methods.

If the processing in step S8002 is performed according to the flowchart in FIG. 9, in step S9011, the CPU 1001 changes the pan, tilt, and roll. Meanwhile, if the processing in step S8007 is performed according to the flowchart in FIG. 9, in step S9011, the CPU 1001 changes the tilt and roll.

In step S9012, the CPU 1001 specifies (obtains) the external parameters having the highest corresponding evaluation value among the external parameters stored in the memory 1003. In step S9013, the CPU 1001 outputs the external parameters specified/obtained in step S9012.

As described in the second embodiment, the processing according to the flowchart in FIG. 2 can also be used to calculate the external parameters. However, the processing according to the flowchart in FIG. 9 (calculating the external parameters) is performed at a higher speed. For example, in the flowchart in FIG. 2, the image generation in step S2003 and the straight line detection in step S2004 are included in the search loop. On the other hand, in the flowchart in FIG. 9, the image generation in step S9003 and the straight line detection in step S9004 are executed only once, and the image generation and the straight line detection are not included in steps S9007 to S9011, which correspond to the search loop. Although the processing in step S9007 is coordinate conversion, the number to be converted is twice the number of straight line edges detected, and is only several tens to several thousands, depending on the image. Compared to the number of coordinate conversions performed in step S2003, this is on the order of $1/100$ to $1/1,000$. Accordingly, the processing according to the flowchart in FIG. 9 (calculating the external parameters) is performed on the order of $1/100$ to $1/1,000$ of the time required for the parameter search in the flowchart in FIG. 2.

Incidentally, if the first corrected image is converted to the first image, and the first image is then converted to the first corrected image having changed only the external parameters, the straight line edge detected in step S9004 stays a straight line. The straight line in the first corrected image stays a straight line even when oriented at a different angle. This is the same as keeping a straight line in an image as a straight line without curvature regardless of where an image capturing apparatus that uses a distortion-free f tan–$\theta$ lens is inclined.

However, if the internal parameters are changed here, a line that was a straight line will no longer be a straight line, and even if only the coordinates of the start point and end point are converted, the line connecting the two points will no longer be a straight line. On the other hand, a line that was not a straight line becomes a straight line. Because of this, the flow for calculating the external parameters cannot be applied to the calculation of the internal parameters, and thus it is necessary to perform processing according to the flowchart in FIG. 2 as usual to calculate the internal parameters. However, roughly aligning the external parameters here makes it possible to accelerate the processing by narrowing the angle at which the scanning is carried out according to the flowchart in FIG. 2 to be nearly vertical or horizontal.

An evaluation value calculation method 1, which is one of the methods for calculating the evaluation value that can be applied in step S9009, will be described next. The evaluation value calculation method 1 calculates the evaluation value using the angles and the lengths included in the straight line information.

Here, the evaluation value calculation method differs between when the pan, tilt, and roll are calculated in step S8002 when the tilt and roll are calculated in step S8007. When calculating the pan, tilt, and roll in step S8002, it is preferable that vertical lines be vertical and horizontal lines be horizontal. On the other hand, when calculating the tilt and roll in step S8007, it is sufficient to ensure only that vertical lines are vertical.

When calculating the pan, tilt, and roll in step S8002, first, the angle $\theta$ of each straight line edge is normalized to $-90$ degrees$\leq\theta<90$ degrees. Then, each straight line edge is classified as straight line edge that is close to vertical or a straight line edge that is close to horizontal. For example, a straight line edge where $|\theta|\leq45$ degrees is taken as a straight line edge close to vertical, and a straight line edge where $45$ degrees$<|\theta|$ is taken as a straight line edge close to horizontal.

$A=(45-|\theta|)/45$ (where $A=1$ indicates a vertical line, and $A=0$ indicates a 45-degree line) is calculated such that the evaluation value is higher the closer to a vertical line ($0$ degrees) the straight line edge is, and using $A$, a vertical direction evaluation value is obtained through the following formula.

$$\text{Vertical direction evaluation value}=\Sigma(A^2\times\text{length})/\\ \Sigma\text{length}$$

"$\Sigma(A^2\times\text{length})$" indicates the sum of the products of the square value of $A$ obtained for the straight line edges that are close to vertical and the lengths of those straight line edges, and "$\Sigma\text{length}$" indicates the sum of the lengths of the straight line edges that are close to vertical. However, if $\Sigma\text{length}=0$, i.e., there is not a single straight line edge that is close to vertical, then the vertical direction evaluation value$=0$.

$B=(45-(90-|\theta|))/45=(-45+|\theta|)/45$ (where $B=1$ indicates a horizontal line, and $B=0$ indicates a 45-degree line) is calculated such that the evaluation value is higher the closer to a horizontal line ($\pm90$ degrees) the straight line edge is. Then, using $B$, a horizontal direction evaluation value is obtained by calculating the following formula.

$$\text{Horizontal direction evaluation value}=\Sigma(B^2\times\text{length})/\\ \Sigma\text{length}$$

"$\Sigma(B^2\times\text{length})$" indicates the sum of the products of the square value of $B$ obtained for the straight line edges that are close to horizontal and the lengths of those straight line edges, and "$\Sigma\text{length}$" indicates the sum of the lengths of the straight line edges that are close to horizontal. However, if $\Sigma\text{length}=0$, i.e., there is not a single straight line edge that is close to horizontal, then the horizontal direction evaluation value$=0$.

In step S8002, it is desirable to handle both vertical lines and horizontal lines, the evaluation value is obtained by calculating "evaluation value$=$vertical direction evaluation value$\times$horizontal direction evaluation value". In this manner, a high evaluation value is obtained from parameters at which vertical lines are close to vertical and horizontal lines are close to horizontal, and if parameters having a high evaluation value are selected, the tilt in the vertical direction, the pan in the horizontal direction, and roll contributing in both the vertical and horizontal directions can be calculated at the same time.

On the other hand, in step S8007, it is sufficient to handle only the vertical lines, and thus the evaluation value is obtained as "evaluation value$=$vertical direction evaluation value". In this manner, a high evaluation value is obtained from parameters at which vertical lines are close to vertical, and, if parameters having a high evaluation value are selected, the tilt in the vertical direction and roll contributing in the vertical direction can be calculated at the same time. Note that, in step S8007, the horizontal direction evaluation value is not used and thus need not be calculated.

Incidentally, in step S8002, if one of the straight line edge in the vertical direction and the straight line edge in the horizontal direction has not been obtained, the evaluation value for that direction will be 0, and the final evaluation value will also be 0. At that time, for example, when the evaluation value for the horizontal direction is 0, the processing of step S8007, which calculates only the tilt and the roll, may be executed, without calculating the pan. Conversely, when the evaluation value for the vertical direction is 0, only the pan and the roll may be calculated, without calculating the tilt.

Incidentally, a straight line edge having an angle with a vertical line or a horizontal line greater than or equal to a set angle is likely to be a straight line edge that originally is neither a vertical line nor a horizontal line. Since such a straight line edge is not a line that should be used as a hint, it is desirable to exclude such an edge from the aggregation (exclude from the straight line information). The exclusion range is based on the angles taken as the current search range. The roll is directly connected to the straight line edge within the image, almost as-is. Because the pan and the tilt rotate in three dimensions, those items are not directly connected, but the angle of the straight line edge changes less than for the roll. Accordingly, if the total search range of the pan, tilt, and roll is taken as the maximum, the conditions for estimating a straight line edge that is originally inclined are not sufficient, but the required conditions are satisfied. For example, if the search range of the pan, tilt, and roll is $\pm5$ degrees, a straight line edge for which the smaller of the angles formed with a vertical line or a horizontal line exceeds fifteen degrees may be excluded from the aggregation. If the search range is gradually changed in step S8006, the exclusion range may be changed accordingly.

An evaluation value calculation method 2, which is one of method for calculating the evaluation value that can be applied in step S9009, will be described next. In the evaluation value calculation method 1, the evaluation value is higher the closer the straight line edge is to a horizontal line or a vertical line. These are the X direction and the Y direction among the three-dimensional coordinate axes, and a direction corresponding to the Z direction is not included. A straight line in the Z direction is displayed as a vanishing line (a line leading to the vanishing point in the image). Here, the evaluation value is made to increase even for a straight line edge that is close to a vanishing line. A vanishing line is defined for each detected straight line edge. Of the start point and the end point of a straight line edge, a line passing through the point furthest from the vanishing point, and the vanishing point itself, is defined as a vanishing line.

The angle formed by a straight line edge and the vanishing line relative to that straight line edge is taken as C. C is a maximum of ninety degrees. If the angle C found in this manner is less than an angle V formed with the vertical line or an angle H formed with the horizontal line in the method for calculating the evaluation value described above, the straight line edge is classified as a straight line edge close to the vanishing line. If not, the straight line edge is classified as a straight line edge closer to either a vertical line or a horizontal line.

An evaluation value D for the angle formed with the vanishing line is defined as $D=(45-C)/45$. If the straight line edge overlaps with the vanishing line, $D=1$. The evaluation value of the angle formed with the vertical line and the evaluation value of the angle formed with the horizontal line are the same as in the method for calculating the evaluation value described above. A corresponding evaluation value is obtained by calculating the following formula for each of a straight line edge close to a vertical line, a straight line edge close to a horizontal line, and a straight line edge close to a vanishing line classified in this manner.

$$A=(45-|\theta|)/45$$

Vertical direction evaluation value$=\Sigma(A^2 \times length)/\Sigma length$ $$B=(-45+|\theta|)/45$$

Horizontal direction evaluation value$=\Sigma(B^2 \times length)/\Sigma length$ $$D=(45-C)\div45 \ (C: angle\ formed\ with\ vanishing\ line)$$

Vanishing line direction evaluation value$=\Sigma(D^2 \times length)/\Sigma length$ The methods for obtaining the vertical direction evaluation value and the horizontal direction evaluation value are as described above. In the formula for obtaining the vanishing line direction evaluation value, "$\Sigma length$" represents the sum of the lengths of the straight line edges close to a vanishing line. The evaluation value which is ultimately obtained is then obtained according to the following formula.

Evaluation value$=$vertical direction evaluation value$\times$ horizontal direction evaluation value$\times$vanishing line direction evaluation value Compared to a case when only the straight line edges in the X direction and the straight line edges in the Y direction are used, this method of obtaining the evaluation value can improve the calculation accuracy of the pan, tilt, and roll by adding straight line edges in the Z direction.

Additionally, when the evaluation value in any direction is zero, a product using only the evaluation value in the remaining one or two directions in which the evaluation value is not zero may be taken as the evaluation value, and only the calculable parameters may be calculated, in the same manner as in the evaluation value calculation method 1. If an evaluation values in any two directions remain (if the evaluation values in any two directions are not zero), the three items of pan, tilt, and roll can be calculated. The tilt and roll can be calculated as long as the vertical direction evaluation value remains. The pan and roll can be calculated as long as the horizontal direction evaluation value remains. The tilt and pan can be calculated as long as the vanishing line direction evaluation value remains.

Incidentally, near the horizontal center of the image (a region close to the vanishing point in the horizontal direction), the vanishing line is closer to a vertical line, and is difficult to distinguish from a vertical line. Meanwhile, near the vertical center of the image (a region close to the vanishing point in the vertical direction), the vanishing line is closer to a horizontal line, and it is difficult to distinguish from a horizontal line. There are thus cases when a search is performed which approaches the wrong direction. Accordingly, straight line edges within a range of ±x pixels in the horizontal direction from the vanishing point (where x is about 5 to 15% of the image width), or in the range of ±y pixels in the vertical direction (where y is about 5 to 15% of the image height), may be excluded from the calculation of the evaluation value.

Devising an aggregation method used when calculating the evaluation value will be described next. The evaluation value is a value such as the average of the angles, but the lengths are weighted, and thus if there is a long object that is actually inclined, the evaluation value tends to be affected by that object. On the other hand, an object such as a building is expected to have many vertical lines and horizontal lines. As such, straight line edges at angles for which there is not at least a set number of straight line edges having approximately the same angles may be excluded from the calculation of the evaluation value. The method for counting straight line edges having approximately the same angle is determined as follows, for example.

For each angle [θ] rounded to an integer, the number of straight line edges at that angle is counted, and a histogram indicating the number of straight line edges for each angle [θ] is created. Here, θ is normalized to 0 degrees$\leq\theta<$180 degrees, and [ ] is an integer operator. In other words, each straight line edge is taken as an iteration to create a histogram in which the total value of the number of straight line edges corresponding to an index [θ], the number of straight line edges corresponding to an index [θ]−1, and the number of straight line edges corresponding to an index [θ]+1 is taken as the number of straight line edges corresponding to the index [θ]. In this manner, "approximately the same angle" is counted up here. Once all the straight lines are iterated and the corresponding number of straight line edges is counted up, if a straight line is iterated and the count for number of straight line edges corresponding to the index [θ] is less than a threshold G, that straight line edge is excluded. The threshold G is about one to five. For example, assume that straight line edges having angles of 1.1 degrees, 1.2 degrees, 2 degrees, and 4 degrees have been detected. In such a case, the histogram will be as follows:

0 degrees: 2 edges;
1 degree: 3 edges;
2 degrees: 3 edges;
3 degrees: 2 edges;
4 degrees: 1 edge; and
5 degrees: 1 edge.

Straight line edges at 1.1 degrees and 1.2 degrees belong to 1 degree, and correspond to three edges. Straight line edges at 2 degrees belong to 2 degrees, and correspond to three edges. Straight line edges at 4 degrees belong to 4 degrees, and correspond to one edge. Here, if the threshold G is 3, straight line edges at 4 degrees for which there are fewer than three are excluded (straight line edges having an angle frequency that is less than the threshold are excluded), and thus straight line edges are 1.1 degrees, 1.2 degrees, and 2 degrees remain. In other words, a straight line edge at 4 degrees is a straight line edge of a tilted object, and it is sufficient to search for parameters such that straight line edges at 1.1 degrees, 1.2 degrees, and 2 degrees approach 0 degrees.

Although the foregoing describes a histogram that provides a count for each integer angle, each unit of 0.1 degrees, 2 degrees, or the like may be counted, in the case of a discrete classification. In addition, decimals may be discarded or rounded up rather than being rounded off. Additionally, the range of "approximately the same angle" is not limited to ±1 degree, and may be about ±2 to 5 degrees, for example.

In this manner, when there is not at least a set number of straight line edges having approximately the same angle, excluding such straight line edges from the average value calculation makes it possible to prevent inclinations from matching slanted objects, which are considered to be less common, or straight line edges erroneously detected due to noise, or the like.

Note that the way in which the aggregation method used when calculating the evaluation value described above is devised is not limited to that described above in the present embodiment, and may be applied to the evaluation value calculation method 1 of the third embodiment, which also uses the angle of the straight line edge.

In this manner, according to the present embodiment, by tentatively calculating the external parameters at a high speed and accordingly narrowing down the straight line edges detected when calculating the internal parameters to roughly vertical or horizontal edges, the internal parameters and the external parameters can be calculated at a high speed.

Fourth Embodiment

The present embodiment will describe a method for improving the accuracy by devising perspective projection conversion for generating the first corrected image.

In the first embodiment, the first corrected image generated through perspective projection conversion on the first image in step S2003 has a horizontal viewing angle of ninety degrees. However, the first image to be input is a 180-degree fisheye image. In other words, a part at forty-five degrees at the left and right ends is not used for straight line edge detection. It is conceivable that a building serving as an important hint appears in that part.

Although it is possible to widen the angle of view of the image that has undergone the perspective projection conversion, the angle of view cannot be widened to one hundred eighty degrees. Meanwhile, when the first image to be input is a captured image shot using a fisheye lens, the magnification increases as the surrounding angle of view increases, and the resolution decreases. As such, there are cases when the straight line edge cannot be detected correctly. Furthermore, if the surrounding angle of view is to fall within the image, the central part will become smaller, and lines may therefore become too thin for straight line edges to be detected.

In view of this, the present embodiment provides a method for improving the accuracy of internal parameter calculation by using information on parts that are outside the range of the first corrected image (parts that do not fall within the first corrected image due to the perspective projection conversion in the first image).

In the present embodiment, the image processing apparatus executes processing obtained by changing the following points in the processing illustrated in the flowchart in FIG. 2.

In step S2003, the CPU 1001 generates two corrected images (a second corrected image and a third corrected image) in addition to the first corrected image. For example, when the first corrected image in FIG. 4B is generated from the first image in FIG. 4A, a second corrected image, in which the first image is subjected to perspective projection conversion by adding a component of ninety-degree pan rotation to the left at the end of the rotation in addition to the external parameters used in the perspective projection conversion from the first image to the first corrected image, is generated, as illustrated as an example in FIG. 4C. Likewise, when the first corrected image in FIG. 4B is generated from the first image in FIG. 4A, a third corrected image, in which the first image is subjected to perspective projection conversion by adding a component of ninety-degree pan rotation to the right at the end of the rotation in addition to the external parameters used in the perspective projection conversion from the first image to the first corrected image, is generated, as illustrated as an example in FIG. 4D. It is important to add the component of the pan rotation at the end of the rotation. This is because the tilt and the roll are aligned to some extent first, and the pan rotation is performed from an almost horizontal state, while staying horizontal.

FIG. 5A illustrates the horizontal field of view of the first image, FIG. 5B illustrates the horizontal field of view of the first corrected image, FIG. 5C illustrates the horizontal field of view of the second corrected image, and FIG. 5D illustrates the horizontal field of view of the third corrected image.

In FIGS. 5A to 5D, the common semicircle 5001 indicates the horizontal field of view of the first image. In FIG. 5A, only the horizontal field of view 5001 of the first image is illustrated. A triangle 5002 in FIG. 5B indicates the horizontal field of view of the first corrected image. An arrow 5003 in FIG. 5B indicates the direction of the vanishing point in the first corrected image. A triangle 5004 in FIG. 5C indicates the horizontal field of view of the second corrected image. An arrow 5005 in FIG. 5C indicates the direction of the vanishing point in the second corrected image. A triangle 5006 in FIG. 5D indicates the horizontal field of view of the third corrected image. An arrow 5007 in FIG. 5D indicates the direction of the vanishing point in the third corrected image. In these diagrams, the triangle 5002 appears at ninety degrees in the central part, the triangle 5004 appears at forty-five degrees in the left part, and the triangle 5006 appears at forty-five degrees in the right part, with respect to the horizontal field of view 5001 of the first image. This is a case where the pan angle of the external parameters set in step S2002 is zero degrees. When the pan angle is not 0 degrees, each is shifted clockwise or counterclockwise.

In step S2004, the CPU 1001 generates straight line information by performing the processing of step S2004, described in the first embodiment, for the first corrected image, the second corrected image, and the third corrected image, respectively.

Note that the assignment of the horizontal field of view is not limited to that illustrated in FIGS. 5A to 5D, and may be slightly overlapping or slightly insufficient. Although overlapping straight line edges may be detected in an overlapping part in step S2004, even if the same part of the original first image appears in the first corrected image, the second corrected image, and the third corrected image, the magnification, the inclination, and the like, are displayed differently, and thus the methods for detecting the straight line edge are not uniform.

Figure 4A:
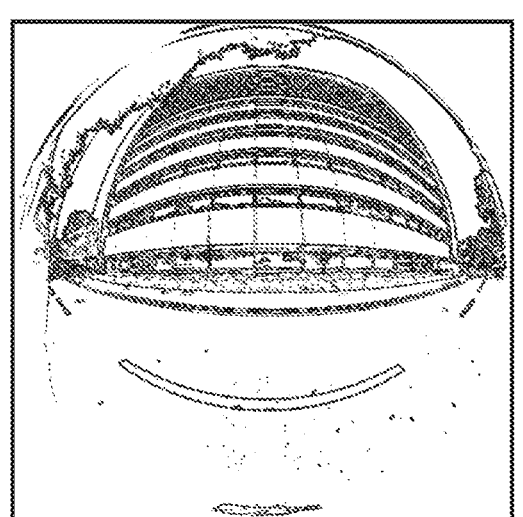
FIG. 4A is a diagram illustrating an example of a first image.
Figure 4B:
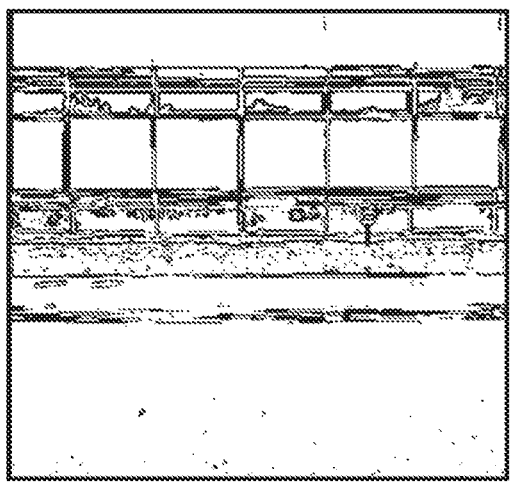
FIG. 4B is a diagram illustrating an example of a first corrected image.
Figure 4C:
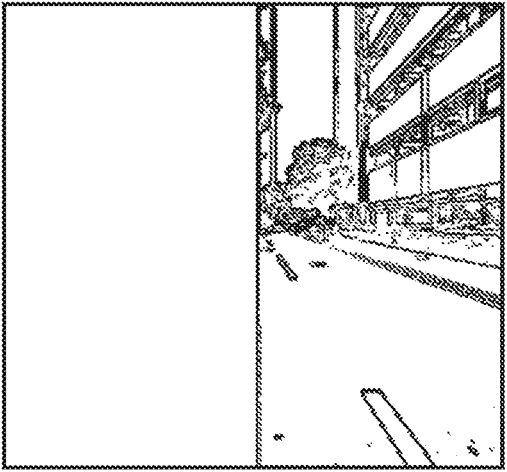
FIG. 4C is a diagram illustrating an example of a second corrected image.
Figure 4D:
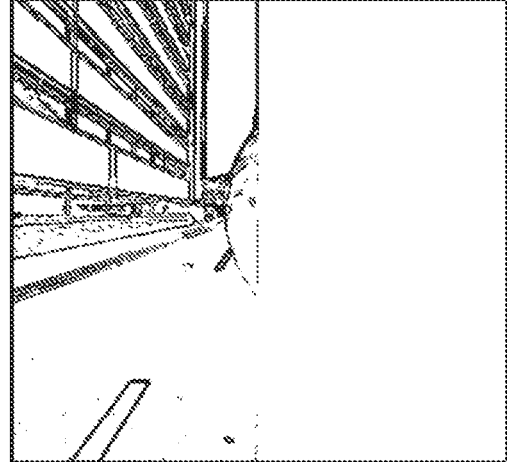
FIG. 4D is a diagram illustrating an example of a third corrected image.

The second corrected image illustrated in FIG. 4C and the third corrected image illustrated in FIG. 4D show parts of the left and right ends of the first image illustrated in FIG. 4A, white lines on a road, and the like. Because the angle of view of the first image is one hundred eighty degrees horizontal, there is no field of view to the left of a direction 5005 of the vanishing point, and thus nothing appears in the left half of the second corrected image. Meanwhile, there is no field of view to the right of a direction 5007 of the vanishing point, and thus nothing appears in the right half of the third corrected image. Since it is meaningless to subject parts in which nothing appears to the processing in later stages, parts of the image from which parts in which nothing appears have been cropped from the second corrected image and the third corrected image may be taken as the second corrected image and the third corrected image, respectively. When cropping, the cropping amount may be taken into account with the coordinates of the start point and the end point when the straight line edge is detected. Alternatively, the field of view may be extended to the right side of the horizontal field of view represented by the triangle 5004 and the left side of the horizontal field of view represented by the triangle 5006, such that the area is the same as the horizontal field of view represented by the triangle 5002.

Similar to the first embodiment, the evaluation value is obtained for each internal parameter from the straight line information obtained from the first corrected image, the second corrected image, and the third corrected image, and the internal parameters for which the evaluation value is the highest are output as the correct internal parameters.

Note that the above-described method for creating the corrected images may be combined with the third embodiment. In this case, in step S9003, three corrected images are generated, and in step S9004, straight line information is generated for the three corrected images. Which corrected image was used to generate the straight line information is made distinguishable here. Then, in step S9005 and in step S9007, the coordinates of the start point and the end point are transformed using the parameters corresponding to each corrected image. Then, in step S9009, processing is performed for the respective pieces of straight line information of the straight line information group generated from the three corrected images, as described above.

In this manner, using not only the first corrected image, but also the second corrected image and the third corrected image, which have been further rotated, to calculate the straight line information and use that information for subsequent processing makes it possible to increase the number of straight line edges detected and improve the accuracy.

Meanwhile, a shift in the magnification parameter indicates a shift in the magnification of the first image, which is the input image, and has the property of shifting the position more in peripheral parts than in the central part of the image. Accordingly, as a hint for calculating the magnification parameter, the search is more likely to converge if there is an image in the periphery.

Additionally, the first image illustrated in FIG. 4A was shot from in front of the building, and thus the first corrected image facing in the forward direction faces the building, but it is also possible that a shot will be taken while walking in the direction of the road, without showing the building. In this case, the way in which the first corrected image of the front appears in the second corrected image and third corrected image on the left and right will be reversed. Many of the vertical and horizontal lines that serve as hints are displayed in the second corrected image or the third corrected image. In this manner, even when there are no man-made objects such as buildings in the first corrected image, if there are man-made objects in the left-facing second corrected image or the right-facing third corrected image, the internal parameters can be calculated.

Although the present embodiment describes an example in which the second corrected image and the third corrected image are generated by ninety-degree pan rotation in the left and right directions, a part in which nothing appears is generated because the field of view is insufficient, and thus the pan may be rotated within a range of the angle of view of the first image, such as forty-five degrees, instead of being limited to ninety degrees. However, when combined with the third embodiment, the pan rotation should be ninety degrees. This is because the horizontal line and the vanishing line in the first corrected image are replaced by the vanishing line and the horizontal line in the second corrected image and the third corrected image only in the case of ninety-degree pan rotation.

Additionally, the processing is not limited to the horizontal direction, and may be performed in the vertical direction, and five corrected images may be handled by adding both the horizontal and vertical directions. However, in an image shot outdoors, only curved asphalt, the ground surface, and the like, appear in the field of view in the downward direction, and only the sky appears in the upward direction, and as such, straight line edges that serve as hints cannot be expected to increase. If the image is one shot indoors, the floor and ceiling are expected to be horizontal, and the accuracy can be expected to improve when tiles, or the like, are present. Accordingly, when the first image is determined to be an image shot indoors, such as when the user has operated a user interface such as a keyboard, a mouse, or the like, to indicate that the first image is an image shot indoors, when the user has recognized the first image and determined that the first image is an image shot indoors, when the user has indicated that the shooting position of the obtained first image is indoors using a GPS, or the like, the two corrected images may be obtained through rotation at an appropriate angle in the vertical direction (although this is not limited to the vertical direction).

The numerical values, the processing timing, the processing order, the entities performing the processing, the destination/source/storage location of data (information), and the like used in the embodiments described above have been given as examples for the purpose of providing detailed descriptions, and are not intended to be limited to such examples.

Additionally, some or all of the embodiments described above may combined as appropriate. Furthermore, some or all of the embodiments described above may be used selectively.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:

at least one processor operatively coupled to a memory, serving as:

a generation unit configured to generate a corrected image in which distortion in a captured image shot by an image capturing apparatus is corrected; and an obtainment unit configured to obtain an internal parameter of the image capturing apparatus based on a straight line edge in the corrected image, wherein the generation unit generates, for each of a plurality of parameter candidates serving as correct candidates for the internal parameter of the image capturing apparatus, a corrected image by performing a perspective projection conversion on the captured image using the parameter candidate, wherein the obtainment unit obtains one of the plurality of parameter candidates as the internal parameter of the image capturing apparatus based on a straight line edge in each corrected image generated by the generation unit, and wherein, for each of a plurality of rotated images obtained by rotating the corrected image by respective different rotation angles, the obtainment unit obtains a length of a vertical straight line edge in the rotated image, obtains an evaluation value having a value that becomes higher as a total of the lengths obtained increases, and obtains a parameter candidate, among the plurality of parameter candidates, which provides a highest evaluation value as the internal parameter of the image capturing apparatus.

2. The image processing apparatus according to claim 1, wherein, for each of combinations of a plurality of parameter candidates that are correct candidates for an external parameter of the image capturing apparatus and a plurality of parameter candidates that are correct candidates for the internal parameter of the image capturing apparatus, the generation unit generates the corrected image by performing a perspective projection conversion on the captured image using the combination, and the obtainment unit obtains one of the combinations as a combination of the external parameter and the internal parameter of the image capturing apparatus based on a straight line edge in each corrected image generated by the generation unit.

3. The image processing apparatus according to claim 2, wherein, for each of a plurality of rotated images obtained by rotating the corrected image by respective different rotation angles, the obtainment unit obtains an evaluation value having a value that becomes higher as a length of a vertical straight line edge in the rotated image increases and becomes lower the more the vertical straight line edge is tilted from a vertical direction in the rotated image, and obtains a combination, among the combinations, which provides a highest evaluation value as the combination of the external parameter and the internal parameter of the image capturing apparatus.

4. The image processing apparatus according to claim 2, wherein the obtainment unit obtains a length of a vertical straight line edge in the corrected image, obtains an evaluation value having a value that becomes higher as a total of the lengths obtained increases, and obtains a combination, among the combinations, which provides a highest evaluation value as the combination of the external parameter and the internal parameter of the image capturing apparatus.

5. The image processing apparatus according to claim 2, wherein the obtainment unit obtains one of the plurality of parameter candidates as the internal parameter of the image capturing apparatus based on a straight line edge corresponding to a line aside from a line of a ground surface in the corrected image.

6. The image processing apparatus according to claim 1, wherein the at least one processor operatively coupled to a memory, further serve as:

a second obtainment unit configured to tentatively calculate an external parameter of the image capturing apparatus, wherein the generation unit generates the corrected image using the external parameter tentatively calculated by the second obtainment unit, and the obtainment unit obtains the internal parameter of the image capturing apparatus based on a straight line edge in the corrected image.

7. The image processing apparatus according to claim 6, wherein the second obtainment unit tentatively calculates the external parameter based on a straight line edge in the corrected image obtained by converting a straight line edge in the captured image corresponding to a straight line edge in the corrected image based on a current internal parameter and a current external parameter.

8. The image processing apparatus according to claim 7, wherein the second obtainment unit tentatively calculates the external parameter of the image capturing apparatus based on (i) a length, and an angle relative to a vertical direction, of a straight line edge, among straight line edges in the corrected image, that is classified as a straight line edge close to the vertical direction, and (ii) a length, and an angle relative to a horizontal direction, of a straight line edge, among the straight line edges in the corrected image, that is classified as a straight line edge close to the horizontal direction.

9. The image processing apparatus according to claim 7, wherein the second obtainment unit tentatively calculates the external parameter of the image capturing apparatus based on (i) a length, and an angle relative to a vertical direction, of a straight line edge, among straight line edges in the corrected image, that is classified as a straight line edge close to the vertical direction, (ii) a length, and an angle relative to a horizontal direction, of a straight line edge, among the straight line edges in the corrected image, that is classified as a straight line edge close to the horizontal direction, and (iii) a length, and an angle relative to a vanishing line, of a straight line edge, among the straight line edges in the corrected image, that is classified as the vanishing line.

10. The image processing apparatus according to claim 6, wherein the second obtainment unit tentatively calculates the external parameter based on straight line edges excluding straight line edges of a frequency with respect to a vertical direction that is less than a threshold, among straight line edges in the corrected image obtained by converting a straight line edge in the captured image corresponding to a straight line edge in the corrected image based on a current internal parameter and a current external parameter.

11. The image processing apparatus according to claim 1, wherein the generation unit generates a corrected image in which distortion in the captured image is corrected, and a corrected image in which distortion in the captured image is corrected and the captured image is rotated, and the obtainment unit obtains a parameter of the image capturing apparatus based on a straight line edge in each corrected image generated by the generation unit.

12. The image processing apparatus according to claim 11, wherein the generation unit generates a corrected image in which distortion in the captured image is corrected, and when the captured image is determined to be an image shot indoors, generates a corrected image in which distortion in the captured image is corrected and the captured image is rotated.

13. An image processing method comprising:

generating a corrected image in which distortion in a captured image shot by an image capturing apparatus is corrected; and obtaining an internal parameter of the image capturing apparatus based on a straight line edge in the corrected image wherein the generating generates, for each of a plurality of parameter candidates serving as correct candidates for the internal parameter of the image capturing apparatus, a corrected image by performing a perspective projection conversion on the captured image using the parameter candidate, the obtaining obtains one of the plurality of parameter candidates as the internal parameter of the image capturing apparatus based on a straight line edge in each corrected image generated by the generating, and wherein, for each of a plurality of rotated images obtained by rotating the corrected image by respective different rotation angles, the obtaining obtains a length of a vertical straight line edge in the rotated image, obtains an evaluation value having a value that becomes higher as a total of the lengths obtained increases, and obtains a parameter candidate, among the plurality of parameter candidates, which provides a highest evaluation value as the internal parameter of the image capturing apparatus.

14. A non-transitory computer-readable storage medium having stored therein a program for causing a computer to function as:

a generation unit configured to generate a corrected image in which distortion in a captured image shot by an image capturing apparatus is corrected; and an obtainment unit configured to obtain an internal parameter of the image capturing apparatus based on a straight line edge in the corrected image, wherein the generation unit generates, for each of a plurality of parameter candidates serving as correct candidates for the internal parameter of the image capturing apparatus, a corrected image by performing a perspective projection conversion on the captured image using the parameter candidate, wherein the obtainment unit obtains one of the plurality of parameter candidates as the internal parameter of the image capturing apparatus based on a straight line edge in each corrected image generated by the generation unit, and wherein, for each of a plurality of rotated images obtained by rotating the corrected image by respective different rotation angles, the obtainment unit obtains a length of a vertical straight line edge in the rotated image, obtains an evaluation value having a value that becomes higher as a total of the lengths obtained increases, and obtains a parameter candidate, among the plurality of parameter candidates, which provides a highest evaluation value as the internal parameter of the image capturing apparatus.

\* \* \* \* \*